US012786719B2

(12) United States Patent
Youngs et al.

(10) Patent No.: US 12,786,719 B2
(45) Date of Patent: Nov. 3, 2026

(54) COMMUNICATION CAPABILITIES SELECTION-BASED SECURITY MANAGEMENT

(71) Applicant: T-Mobile USA, Inc, Bellevue, WA (US)

(72) Inventors: Simon Youngs, Overland Park, KS (US); Ayman Zaki, Renton, WA (US); Thomas Chillson, Olathe, KS (US); Sanjay Kumar, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 62 days.

(21) Appl. No.: 18/589,140

(22) Filed: Feb. 27, 2024

(65) Prior Publication Data

US 2025/0274760 A1 Aug. 28, 2025

(51) Int. Cl.

| | |
|---|---|
| ***H04W 12/122*** | (2021.01) |
| ***H04L 65/1104*** | (2022.01) |
| ***H04W 8/22*** | (2009.01) |

(52) U.S. Cl.

CPC ....... *H04W 12/122* (2021.01); *H04L 65/1104* (2022.05); *H04W 8/22* (2013.01)

(58) Field of Classification Search

CPC .... H04W 12/122; H04W 8/22; H04L 65/1104

(Continued)

(56) References Cited

U.S. PATENT DOCUMENTS 8,072,973 B1 * 12/2011 Kotha ................. H04L 12/4641 370/389
10,264,413 B1 * 4/2019 Bogineni ................ H04W 4/12

(Continued)

FOREIGN PATENT DOCUMENTS

EP 3282628 A1 * 2/2018 ........... H04L 5/0082
WO WO-2020225673 A1 * 11/2020 ............ H04W 60/06

(Continued)

OTHER PUBLICATIONS

Chen et al., "Detection, Traceability, and Propagation of Mobile Malware Threats," in IEEE Access, vol. 9, pp. 14576-14598, 2021, doi: 10.1109/ACCESS.2021.3049819. (Year: 2021).*

(Continued)

*Primary Examiner* — Peter C Shaw
(74) *Attorney, Agent, or Firm* — Lee & Hayes, P.C.

(57) ABSTRACT

Described herein are techniques, devices, and systems for utilizing subscriber and user equipment (UE) related content to generate limitations of rich communications service (RCS) capabilities as antispam security measures. The RCS capabilities limitations can be utilized to strip RCS capabilities from possible malicious UEs. The UEs can be identified as the possible malicious UEs by scanning telecommunications networks for behavior of the UEs that is identified as being possible malicious behavior. Stripping the RCS capabilities can include downgrading capabilities of the possible malicious UEs from RCS capabilities to short messaging service (SMS)/multimedia messaging service (MMS) capabilities. Communications associated with the possible malicious UEs being identified as malicious UEs can be monitored and analyzed to restrict communication of communications identified as malicious messages.

20 Claims, 6 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2010/0195493 | A1* | 8/2010 | Hedman | H04W 8/245 370/230 |
| 2014/0308920 | A1* | 10/2014 | Bendi | H04W 12/128 455/26.1 |
| 2016/0259923 | A1* | 9/2016 | Papa | H04W 12/35 |
| 2017/0289183 | A1* | 10/2017 | Tiernan | H04L 63/1425 |
| 2018/0295157 | A1* | 10/2018 | Marappa Gounder | H04L 65/1046 |
| 2019/0356635 | A1* | 11/2019 | Chiang | H04L 63/0281 |
| 2020/0028863 | A1* | 1/2020 | Wolfson | H04L 63/0236 |
| 2022/0060891 | A1* | 2/2022 | Synal | H04L 65/1016 |
| 2022/0303297 | A1* | 9/2022 | Kessel | H04L 63/1416 |
| 2023/0123249 | A1* | 4/2023 | He | H04W 36/008357 370/329 |
| 2024/0171992 | A1* | 5/2024 | Marzban | G06N 20/00 |

FOREIGN PATENT DOCUMENTS

| | | | | |
|---|---|---|---|---|
| WO | WO-2022191745 A1 * | 9/2022 | | H04W 12/122 |
| WO | WO-2023094261 A1 * | 6/2023 | | H04W 4/90 |

OTHER PUBLICATIONS

Sundareswaran et al., “The Network Model to Prevent the Mobile Malware in the Distributed Environment,” 2014 3rd International Conference on Eco-friendly Computing and Communication Systems, Mangalore, India, 2014, pp. 212-216, doi: 10.1109/Eco-friendly.2014.50. (Year: 2014).*

Guo et al., “A behavior analysis based Mobile Malware Defense System,” 2012 6th International Conference on Signal Processing and Communication Systems, Gold Coast, QLD, 2012, pp. 1-6, doi: 10.1109/ICSPCS.2012.6507944. (Year: 2012).*

Cabdal-Ventureira et al., “Quarantining Malicious IoT Devices in Intelligent Sliced Mobile Networks,” arXiv:2403.19731, Mar. 28, 2024. (Year: 2024).*

Kotulski et al., “On end-to-end approach for slice isolation in 5G networks. Fundamental challenges,” 2017 Federated Conference on Computer Science and Information Systems (FedCSIS), Prague, Czech Republic, 2017, pp. 783-792, doi: 10.15439/2017F228. (Year: 2017).*

Leong et al., “Smart card-based irregular access patterns detection system,” IEEE International Conference on e-Technology, e-Commerce and e-Service, 2004. EEE ’04. 2004, Taipei, Taiwan, 2004, pp. 546-553, doi: 10.1109/EEE.2004.1287363. (Year: 2004).*

Conceição et al., “Real-Time Dynamic Security for ProSe in 5G,” 2019 2nd International Conference on Signal Processing and Information Security (ICSPIS), Dubai, United Arab Emirates, 2019, pp. 1-4, doi: 10.1109/ICSPIS48135.2019.9045904. (Year: 2019).*

Jover et al., “Security and Protocol Exploit Analysis of the 5G Specifications,” in IEEE Access, vol. 7, pp. 24956-24963, 2019, doi: 10.1109/ACCESS.2019.2899254. (Year: 2019).*

Vrind et al., “Session cloning protocol between smart devices for connected and un-connected states in B4G and 5G,” 2018 15th IEEE Annual Consumer Communications & Networking Conference (CCNC), Las Vegas, NV, USA, 2018, pp. 1-8, doi: 10.1109/CCNC.2018.8319191. (Year: 2018).*

* cited by examiner

COMMUNICATION CAPABILITIES SELECTION-BASED SECURITY MANAGEMENT

BACKGROUND

Telecommunications networks may utilize various security functions as protection for safely transmitting and receiving data. The security functions may enable the telecommunications networks to minimize fraud due to network and/or device vulnerabilities. The security functions may include storing content identifying bad actors. The content identifying the bad actors that is stored may be identified by monitoring and inspecting network traffic. The stored content may be utilized to reduce communication capabilities and/or amounts of subsequent communications associated with the bad actors. The communications being limited for the bad actors may include text messaging communications, such as short messaging service (SMS) communications and multimedia messaging service (MMS) communications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
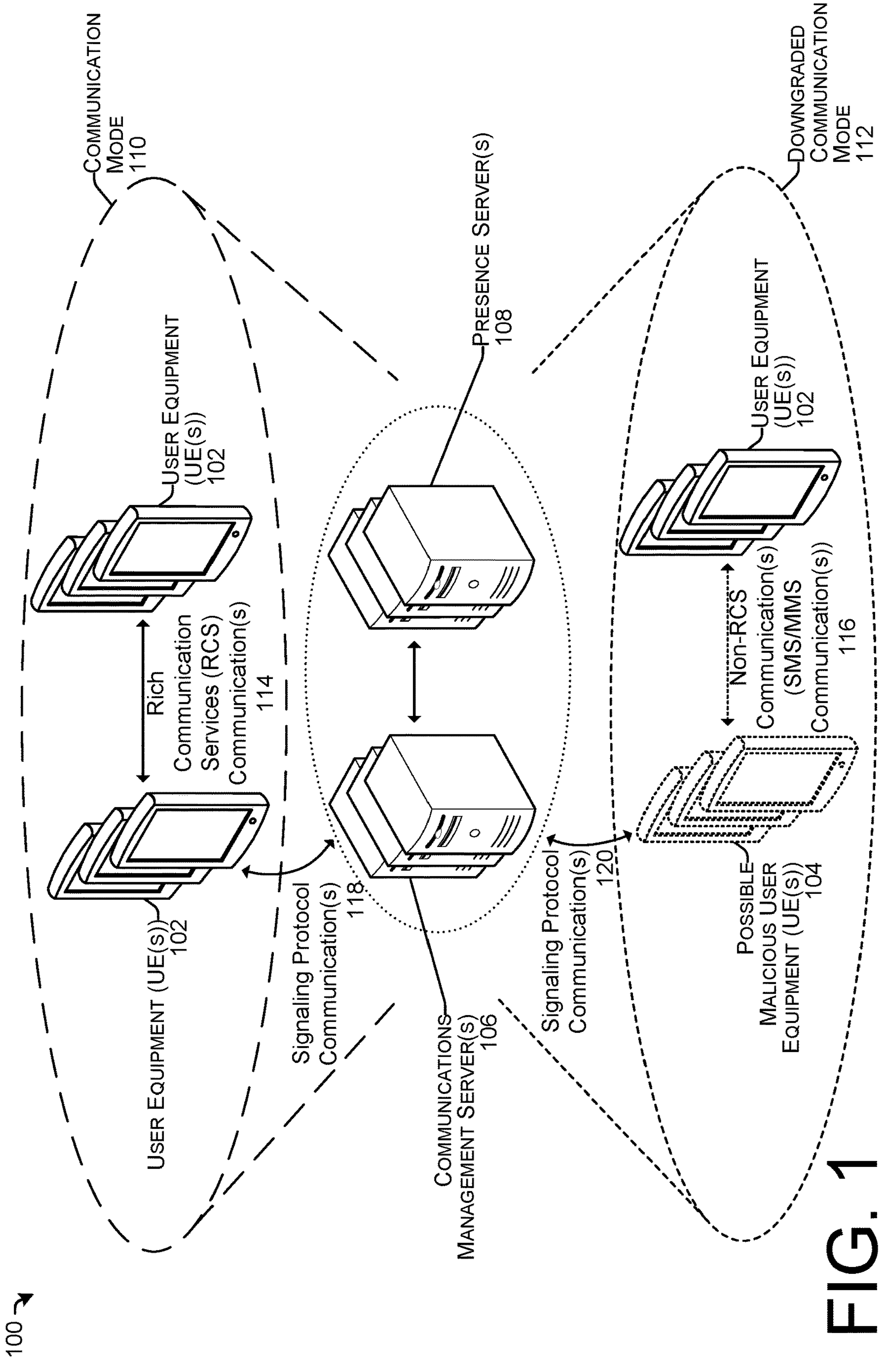
FIG. 1 schematically illustrates an example environment for identifying possible malicious user equipment (UEs) from among UEs exchanging communications and downgrading the possible malicious UEs from having rich communication services (RCS) capabilities to non-RCS capabilities.

Existing security procedures for telecommunications networks include anti-spam procedures utilized to scan network transmissions and identify malicious transmissions from among the scanned transmissions. The scanned transmissions may include short messaging service (SMS) transmissions and multimedia messaging service (MMS) transmissions. The SMS and MMS transmissions may be scanned due to the data in the transmissions being unencrypted. The scanned SMS and MMS transmissions may be utilized to identify user equipments (UEs) identified as malicious UEs. The identified malicious UEs may be identified to manage SMS and MMS transmissions associated with the malicious UEs. However, with advancements in levels of sophistication utilized by bad actors to disseminate malicious communications, such as rich communication services (RCS) communications with encrypted data, service providers utilizing the security procedures according to conventional technology may be unable to identify whether the RCS communications are malicious.

Techniques described herein are directed to utilizing subscriber and UE related content to generate limitations of RCS capabilities as antispam security measures. The RCS capabilities limitations can be utilized to strip RCS capabilities from possible malicious UEs. UEs can be identified as the possible malicious UEs by scanning telecommunications networks for behavior of the UEs that is identified as being possible malicious behavior. Stripping the RCS capabilities can include downgrading capabilities of the possible malicious UEs from RCS capabilities to SMS/MMS capabilities. Communications associated with the possible malicious UEs being identified as malicious UEs can be monitored and analyzed to restrict communication of communications identified as malicious communications.

As described above, in some examples, a telecommunications network can be monitored and scanned to identify behavior associated with a UE. Scanning of the telecommunications network can be performed by monitoring communications being exchanged with the UE. Monitoring of the communications can include analyzing, by a machine learning (ML) model, the communications, such as text messaging communications. The ML model analysis can include a rules engine model being utilized to identify the UE as a possible malicious UE. Capabilities of the possible malicious UE can be downgraded to limit the possible malicious UE from exchanging RCS communications. Communications, including SMS/MMS communications, may be monitored (e.g., monitored more easily, being unencrypted, in comparison to RCS communications, which are frequently encrypted) to identify malicious communications from among the SMS/MMS communications, and limit the malicious communications.

Accordingly, the techniques, devices, and systems described herein improve the security and resiliency of telecommunications networks by limiting exchanges with bad actors of certain types of communications, such as RCS communications. The exchanges of the RCS communications may be limited due to the RCS communications being difficult to manage security-wise. The RCS communications may be difficult to manage security-wise due to the RCE communications that include encrypted data. The limiting of the exchanges of the RCS communications that include the encrypted data may include restricting capabilities of the bad actors to only include capabilities for relatively less complex and unencrypted communications, such as SMS/MMS communications.

Furthermore, network resources may be conserved by performing security-related limiting of communication capabilities for possible malicious UEs. The conserving of the network resources may be realized by demoting the UEs identified as the malicious UEs. The possible malicious UEs may be identified as the malicious UEs and utilized to restrict the malicious UEs to exchanging only non-RCS communications. The UEs that are identified as the malicious UEs and demoted to have only the non-RCS communications capabilities may decrease the network resources that would otherwise be required for exchanging communications with the malicious UEs according to conventional technology.

Network resources may be conserved based on the restrictions for the possible malicious UEs to only being able to utilize non-RCS communications, as well as differences between the non-RCS communications and the RCS communications. The network resources may be conserved further based on differences between the corresponding protocols for non-RCS communications and RCS communications.

The techniques, devices, and systems described herein may be particularly beneficial for minimizing sizes of communications exchanged with the possible malicious UEs. Networks operated according to techniques discussed herein may result in sizes of the communications exchanged with the possible malicious UEs being lower than for networks operated according to conventional techniques. The sizes of the communications being exchanged with the possible malicious UEs that are connected to the networks operated according to techniques discussed may be relatively lower due to the protocol for non-RCS communications having a lower character limit and not supporting file transfers. By restricting the possible malicious UEs to utilizing only the non-RCS communications, which are most often significantly smaller in size than the RCS communications, network bandwidth is conserved, and data throughput is increased.

The techniques, devices, and systems described herein may be also particularly beneficial for minimizing numbers of communications exchanged with the possible malicious UEs. Numbers of communications exchanged with the possible malicious UEs may be decreased due to numbers of bulk non-RCS communications being used less frequently than bulk RCS communications. The occurrence of bulk non-RCS communications may be less commonplace than bulk RCS communications due to the procedure supported by the protocol for generating and exchanging bulk non-RCS communications being relatively more limited and less convenient than the procedure supported by the protocol for generating and exchanging bulk RCS communications.

Furthermore, network resources may be conserved by flagging and/or blocking non-RCS communications being exchanged with the malicious UEs, such the bad actors, being identified from among the possible malicious UEs. The possible malicious UEs can be identified as the malicious UEs based on the non-RCS communications exchanged with the possible malicious UEs being identified as the malicious non-RCS communications. Identifying the non-RCS communications exchanged with the possible malicious UEs as the malicious non-RCS communications can include analyzing content associated with the non-RCS communications and identifying the non-RCS communications that include spam related content as the malicious non-RCS communications.

Malicious non-RCS communications identified from among non-RCS communications exchanged with the malicious UEs may be blocked in response to the limiting of the capabilities of the possible malicious UEs. Blocking the malicious non-RCS communications can include scouring the network for non-RCS communications associated with the possible malicious UEs. Blocking the malicious non-RCS communications can further include identifying the malicious non-RCS communications from among the non-RCS communications associated with the possible malicious UEs and blocking the malicious non-RCS communications from being delivered to their destinations. Blocking the malicious non-RCS communications can further include restricting the malicious UEs from capabilities of exchanging any communications of any types.

Flagging can be utilized to manage communications being exchanged with the networks based on whether the UEs are identified as being malicious. The malicious UEs, and/or identifier data associated with the malicious UEs, can be flagged. Flagging of the malicious UEs, and/or identifier data associated with the malicious UEs, can be performed, and utilized to inform other service providers, users, etc., that the flagged UEs are malicious.

The other service providers, users, etc., being informed that the flagged UEs are malicious can utilize the flags to manage networks and/or communications more efficiently. Additionally or alternatively, The other service providers, users, etc., being informed that the flagged UEs are malicious can utilize the flags to more effectively identify additional possible malicious UEs as being malicious based on connections between the additional possible malicious UEs and the previously identified malicious UEs. Additionally or alternatively, the additional possible malicious UEs can be identified as malicious UEs based on connections between content associated with the additional possible malicious UEs and content associated with the previously identified malicious UEs.

The techniques, devices, and systems described herein may be particularly beneficial for conserving network bandwidth and increasing data throughput by minimizing numbers of non-RCS communications being exchanged with malicious UEs that are identified from among the possible malicious UEs. By blocking the malicious non-RCS communications, and/or restricting communication capabilities of the malicious UEs, network bandwidth that would be otherwise consumed in networks operated according to conventional technology can be conserved and allocated for other purposes.

Furthermore, compute resources and/or memory resources of various devices may be conserved by reducing numbers and/or sizes of various types of communications in response to controlling communication capabilities of the possible malicious UEs. The downgrading of the possible malicious UEs by the restricting of the possible malicious UEs to the non-RCS communications results in fewer communications being required to be processed by remaining UEs, such as non-malicious UEs. By reducing processing and storing of possible malicious communications and/or malicious communications by the non-malicious UEs, the compute resources and/or memory resources of the non-malicious UEs are conserved.

Furthermore, compute resources and/or memory resources of network devices utilized for enabling and managing the networks may be conserved. The compute resources and/or memory resources of the network devices utilized for enabling and managing of the networks may be conserved by reducing numbers and/or sizes of the various types of communications in response to the controlling of the communication capabilities of the possible malicious UEs. The restricting of the possible malicious UEs to the non-RCS communications results in fewer communications being required to be processed by the network devices. In contrast to numbers and/or sizes of communications processed and/or routed, and/or numbers of sessions established and/or maintained, by existing network devices, the numbers and/or sizes of the communications being processed and/or routed, and/or the numbers of sessions being established and/or maintained, by the network devices operating according to the techniques discussed herein are reduced.

The techniques discussed herein can be implemented in the context of mobile network protocols such as one or more of 3G, 4G, 4G LTE, and/or 5G protocols and a mobile or cellular phone. In some examples, the techniques discussed herein can be implemented on other devices that can use a mobile or cellular connection such as a tablet, a computer, a vehicle, and/or the like. Example implementations are provided below with reference to the following figures.

Also disclosed herein are systems and devices comprising one or more processors and one or more memories, as well as non-transitory computer-readable media storing computer-executable instructions that, when executed, by one or more processors perform various acts and/or processes disclosed herein.

The systems, devices, and techniques described herein can be implemented in a number of ways. References are made to the accompanying drawings that form a part hereof, and in which are shown by way of illustration specific configurations or examples, in which like numerals represent like elements throughout the several figures.

Illustrative Systems for Communication Capabilities Selection-Based Security Management FIG. 1 schematically illustrates an example environment 100 for identifying possible malicious user equipment (UEs) from among UEs exchanging communications and downgrading the possible malicious UEs from having rich communication services (RCS) capabilities to non-RCS capabilities.

The environment 100 can include one or more user equipment (UEs) 102 and/or one or more possible malicious user equipment (UEs) 104. In some instances, individual ones of the possible malicious UE(s) 104 can be included, or not included, in the UE(s) 102. The UE(s) 102 and/or the possible malicious UE(s) 104 can be communicatively coupled to one or more networks, which can be managed and/or operated by one or more service providers. The network(s) can include one or more of any types of networks, including one or more telecommunication networks (or "cellular network(s)"), such as one or more networks in compliance with any of the 3rd Generation Partnership Project (3GPP) standards.

The environment 100 can include one or more servers, which can include one or more communications management servers 106 and/or one or more presence servers 108. In some cases, the server(s), can include one or more service provider servers and/or one or more other servers of one or more other types. Individual ones of the server(s), such as the service provider servers(s), the other server(s), or a combination thereof, can include the communication capabilities management server(s) 106 and/or the presence server(s) 108. For instance, with examples in which the service provider server(s) include the communication capabilities management server(s) 106 and/or the presence server(s) 108, the service provider server(s) can include one or more other service provider servers.

The server(s) can be utilized to manage (e.g., identify, determine, generate, control, modify, remove, update, add, etc.) one or more communication capabilities associated with the UE(s) 102 and/or the possible malicious UE(s) 104. The server(s) can control the communication capability(ies) of the UE(s) 102 and/or the possible malicious UE(s) 104 based on analysis (or "network analysis") of the network(s). For instance, the server(s) can utilize the network analysis, as discussed below in further detail, to control the communication capability(ies) of the UE(s) 102 and/or the possible malicious UE(s) 104.

In various cases, the controlling of the communication capability(ies) can include controlling whether the UE(s) 102 and/or the possible malicious UE(s) 104 have RCE capabilities, respectively. For example, one or more communication modes can include a communication mode 110, such as an RCS communication mode (or "RCS capable mode") (or "RCS capable communication mode") enabling RCS capabilities, and a downgraded communication mode 112, such as a non-RCS communication mode (or "non-RCS capable mode") (or "non-RCS capable communication mode") not enabling RCS capabilities.

The communication mode 110 and/or the downgraded communication mode 112 can be utilized to control the UE(s) 102, the possible malicious UE(s) 104, and/or one or more communications associated therewith. In some examples, the communication mode 110 can be utilized to control one or more communications being exchanged with the UE(s) 102 but not the possible malicious UE(s) 104. In those or other examples, the downgraded communication mode 112 can be utilized to control one or more communications being exchanged with the possible malicious UE(s) 104, and possibly with the UE(s) 102.

Alternatively or additionally, the communication mode 110 and/or the downgraded communication mode 112 can be utilized to control the communication capability(ies) for the UE(s) 102 and/or the possible malicious UE(s) 104. For instance, the communication mode 110 can be utilized to enable one or more RCS communications 114, and/or to enable the UE(s) 102 to be able to exchange the RCS communication(s) 114. In such an instance or another instance, the communication mode 112 can be utilized to disable one or more RCS communications for the possible malicious UE(s) 104 from being able to exchange the RCS communication(s) 114 being disabled, and/or to disable the RCS communication capacity(ies) of the possible malicious UE(s) 104. In such an instance or another instance, the communication mode 112 can be utilized to enable one or more non-RCS communications 116, and/or to enable the UE(s) 102 to be able to exchange the non-RCS communications 116.

In some examples, the communication mode 110 and/or the downgraded communication mode 112 can be utilized to maintain and/or demote the UE(s) 102 and/or the possible malicious UE(s) 104. For instance, the communication mode 110 can be utilized to maintain the UE(s) 102, and/or the capability(ies) of the UE(s) 102, for exchanging the RCS communication(s) 114. In such an instance or another instance, the downgraded communication mode 112 can be utilized to demote the possible malicious UE(s) 104, and/or downgrade the capability(ies) of the possible malicious UE(s) 104, to block the possible malicious UE(s) 104 from being able to exchange the RCS communication(s). In such an instance or another instance, the downgraded communication mode 112 can be utilized to maintain the possible malicious UE(s) 104, the capability(ies) of the possible malicious UE(s) 104, the UE(s) 102, and/or the capability(ies) of the UE(s) 102, for exchanging the non-RCS communications 116.

In various examples, one or more signaling protocol communications can be utilized for exchanging one or more communications. In those or other examples, the communications management server(s) 106, the presence server(s) 108, and/or the UE(s) 102 can utilize one or more signaling protocol communications 118 from among the signaling protocol communication(s) for exchanging the RCS communication(s) 114 and/or one or more SMS/MMS communications. In those or other examples, the communications management server(s) 106, the presence server(s) 108, the UE(s) 102, and/or the possible malicious UE(s) 104 can utilize one or more signaling protocol communications 120 from among the signaling protocol communication(s) for exchanging one or more non-RCS communications 120, such as one or more SMS/MMS communications.

The signaling protocol communication(s), such as the signaling protocol communication(s) 118, the signaling protocol communication(s) 120, one or more other signaling protocol communications can include various types of signaling protocol communications. For example, individual ones of any of the various signaling protocol communication (s) can include one or more subscribe communications (or "session initiation protocol (SIP) subscribe communication (s)"), one or more notify communications (or "SIP notify communication(s)"), one or more publish communications (or "SIP publish communication(s)"), one or more other signaling protocol communication(s), or any combination thereof.

In some examples, for instance with the signaling protocol communication(s) including the SIP subscribe communication(s), the SIP subscribe communication(s) can be transmitted by the UE(s) 102 and/or the possible malicious UE(s) 104, and to the presence server(s) 108. Individual ones of the SIP subscribe communication(s), for instance, can be utilized to create a subscription between a client application of a source, such as a UE 102 and/or a possible malicious UE(s) 104, that desires information from a service, and the service that delivers that information.

In those or other examples, the SIP communication(s) can include one or more SIP publish communications transmitted by the presence server(s) 108, and to individual remaining ones of the UE(s) 102 and/or individual remaining of the possible malicious UE(s) 104 from which the SIP publish communication(s) was not received. Individual ones of the SIP publish communication(s), for instance, can be utilized, when a service of a source, such as a UE 102 and/or a possible malicious UE(s) 104, has something to report. In some examples, the content reported via the SIP publish communication(s) can include a voicemail (e.g., a new voicemail) reported by a voicemail service, 9-1-1 content reported based on a user initiating a 9-1-1 call, patient content (e.g., a patient's name, room number, and electrocardiogram (ECG) reported based on an ECG service, any other content of any type, and so on, or any combination thereof.

In those or other examples, the SIP communication(s) can include one or more SIP notify communications transmitted by the presence server(s) 108, and to the UE(s) 102 and/or the possible malicious UE(s) 104 from which the SIP subscribe communication(s) was received. Individual ones of the SIP notify communication(s), for instance, can be utilized by the presence server(s) 108 that receives the corresponding SIP publish communication(s). The presence server(s) 108 can search one or more tables to identify one or more destinations (e.g., individual ones of the UE(s) 102 and/or individual of the possible malicious UE(s) 104). The presence server(s) 108 can search the table(s) to identify one or more values in the table representing an interest of the destination(s) in the content of the corresponding SIP publish communication(s). The presence server(s) 108 can send the SIP notify communication(s) to the destination(s), and/or to one or more applications associated with the destination (s) and/or the user(s).

The communication capability(ies) associated with the UE(s) 102, such as the RCS communication capability(ies), can be utilized to enable the UE(s) 102 to exchange the RCS communication(s) 114. For instance, the communication capability(ies), such as the RCS communication capability (ies), associated with the UE(s) 102 can be utilized to enable the UE(s) 102 to be able to exchange one or more chats, such as RCS chats (or "RCS chat communication(s)"), and/or any other types of RCS communications, such as encrypted communications.

The communication capability(ies) associated with the malicious UE(s), such as the non-RCS communication capability(ies), can be utilized to disable the malicious UE(s) from exchanging the RCS communication(s) 114. For instance, the communication capability(ies), such as the non-RCS communication capability(ies), associated with the malicious UE(s) can be utilized to disable the malicious UE(s) from being able to exchange one or more chats, such as RCS chats (or "RCS chat communication(s)"), and/or any other types of RCS communications, such as encrypted communications.

The server(s) can perform the management of the communication capability(ies), the communication mode 110, and/or the downgraded communication mode 112, based on the analysis of the network(s). The analysis of the network (s) can include analysis of network traffic. For instance, the network traffic can include an amount of one or more communications exchanged with individual ones of the UE(s) 102 and/or individual ones of the malicious UE(s) 104. The analysis can include, as algorithm-driven analysis of the communication(s), the server(s) utilizing an algorithm to analyze the network(s). The algorithm can be utilized to analyze one or more characteristics associated with the communication(s).

Additionally or alternatively, the analysis of the network (s) can include analysis by the server(s) utilizing a machine learning (ML) model. The ML model can be utilized to execute one or more operations (or "ML operation(s)") and to generate ML model output based on the execution of the operation(s). The ML model can analyze the communication (s) being input to the ML model and output one or more results based on the ML model analysis of the communication(s). The ML model can generate the result(s) as output of the ML model based on the communication(s) being provided as input to, and being analyzed by, the ML model. The ML model analysis can include analysis of the characteristic(s) associated with the communication(s).

The analysis of the networks(s) can include analyzing metadata associated with the UE(s) 102. For example, the metadata can include one or more mobile station international subscriber directory numbers (MSISDNs), one or more IMEI numbers, one or more SIP addresses, etc., or any combination thereof. The metadata can be analyzed and tracked to manage and/or identify the UE(s) 102 as the possible malicious UE(s) 104. The model(s) can include one or more anti-spam engine models utilized to analyze the network(s), such as by analyzing the metadata to identify the UE(s) 102 as the possible malicious UE(s) 104.

Although the analysis of the network(s) can include the algorithm-based analysis and/or the ML model analysis, as discussed above in the current disclosure, it is not limited as such. In various examples, the analysis of the network(s) can include any of one or more type of analysis, including the algorithm-based analysis, the ML model analysis, the algorithm-based analysis and the ML model analysis being integrated together, or any combination thereof.

The network analysis utilizing the characteristic(s) can include analyzing input associated with the communication (s), which can include the characteristic(s) of various types. In some examples, the characteristic(s) can include a communication history, a communication patter, etc. or any combination thereof. In those or other examples, the characteristic(s) can include one or more communication history characteristics, one or more communication pattern characteristics, and so on, or any combination thereof.

In those or other examples, such as for instance with one or more characteristics being identified for any of the UE(s) 102, a communication history associated with a UE 102 can include one or more characteristics, such as a number of communications identified and flagged as possible spam, a number of communications identified and blocked as spam, and so on, or any combination thereof. In those or other examples, such as for instance with the characteristic(s) being identified for any of the UE(s) 102, a communication pattern can include one or more characteristics, such as a volume of communications being sent, how many cellular numbers are being utilized to generate the communications, how many reports of spam are made in response to communications being sent, and so on, or any combination thereof.

In various cases, individual one of one or more values (or "parameters") of the corresponding characteristic(s) can be identified and utilized in the network analysis. For example, a relatively higher parameter of a characteristic being identified as output of the analysis can be utilized to flag any of the UE(s) 102 as a possible malicious UE 104. In such an example, for instance with any of the communication characteristic(s), a relatively higher parameter being identified for the number of communications identified and flagged as possible spam, the number of communications identified and blocked as spam, the volume of communications being sent, the number of cellular numbers being utilized to generate the communications, the reports of spam being made in response to communications being sent, and so on, or any combination thereof. In some instances, a UE 102 can be identified as a malicious UE 104 based on any of the parameter(s) associated with the UE 102 being greater than a threshold parameter, any of the parameter(s) being greater than a corresponding parameter identified for a UE 102 not being identified as a malicious UE 104, and so on, or any combination thereof.

In various examples, reports and/or weights can be utilized for the analysis utilized to determine whether a UE 102 is a possible malicious UE 104. For examples, one or more crowd source reports can be utilized to analyze the UE(s) 102. The crowd source report(s) can be utilized to identify whether a UE 102 is a possible malicious UE 104 based a likelihood of the UE 102 is a possible malicious UE 104 being identified as being greater than a threshold likelihood, based on data in the crowd source report indicating that the UE 102 is a spammer.

The likelihood of the UE 102 being the possible malicious UE 104 can be based on various information, including data in the crow source report, historical behavior of the UE 102, contextual data associated with the UE 102 (e.g., whether a location associated with the UE 102 is a location having a number of spammers that is greater than a threshold number and/or greater than a number of spammer is a number of other locations), any other types of information, or any combination thereof. Additionally or alternatively, the likelihood of the UE 102 being the possible malicious UE 104 can be identified as being greater than the threshold likelihood, based on data in the crowd source report indicating that content transmitted by the UE 102 is spam.

One or more weights can be identified based on the analysis, such as by the crowd source reports. For examples, a weight associated with a UE 102 can be generated based on data in a crowd source report associated with the UE 102. The weight can be relatively higher based on the crowd source report data being relatively more relevant and/or indicative of the UE 102 being the possible malicious UE 104. For example, the analysis can be utilized to identify a relatively higher weight for a UE 102 that receives a number of reports in the crowd source data indicating that the UE 102 is a spammer that is greater than a threshold number. In such an example or another example, the analysis can be utilized to identify a relatively higher weight for a UE 102 with a location that is identified as having a number (e.g., an average number) of UEs previously identified as being spammers that is greater than a threshold number (e.g., a threshold average number). The likelihood of the UE 102 being the possible malicious UE 104 can be identified based on the weight. The likelihood may be relatively higher based on the weight being relatively higher. The likelihood may be relatively lower based on the weight being relatively lower.

One or more actions can be taken based on the UE(s) 102 being identified as the possible malicious UE(s) 104, such as based on individual ones of the UE(s) 102 being identified as corresponding UE(s) of the possible malicious UE(s) 104. In some examples, the action(s) can include one or more subsequent RCS communications of the RCS communication(s) 114 associated with corresponding UEs of the possible malicious UE(s) 104 being blocked by the server(s). In those or other examples, the action(s) can include the server(s) flagging the possible malicious UE(s) 104 and/or the subsequent RCS communication(s) of the RCS communication(s) 114 associated with the possible malicious UE(s) 104. The flagging can be performed in response to the identifying of the possible malicious UE(s) 104.

The blocking can include blocking only certain types of the communication(s) associated with the possible malicious UE(s) 104. In some examples, the blocking can include blocking only communications of a certain, and/or a predetermined, type (e.g., the RCS communication(s) 114), but not any other types of communications. In those or examples, the blocking can include refraining from blocking text messaging communication(s), such as the SMS communication(s) and/or the MMS communication(s) associated with the possible malicious UE(s) 104. For instance, only types of communications associated with RCS capability(ies) but not types of communications associated with non-RCS capability(ies), such as text messaging capability(ies). In such an instance or another instance, the blocking exempts communication(s) associated with SMS capability(ies) and/or MMS capability(ies), being exchanged with the possible malicious UE(s) 104, from being blocked. In such an instance or another instance, the blocking does not include blocking communication(s) associated with SMS capability(ies) and/or MMS capability(ies) from being exchanged with the possible malicious UE(s) 104.

In those or other examples, the server(s) can generate one or more flags indicating that individual ones of the UE(s) 102 have been identified as the possible malicious UE(s) 104. In those or other examples, the server(s) can generate one or more flags indicating that any subsequent RCS communications of the RCS communication(s) 114 associated with the possible malicious UE(s) 104 have been identified as possible fraudulent communication(s) (e.g., possible spam).

In various cases, such as with examples in which the flag(s) are generated by the server(s), the server(s) can transmit the flag(s) to one or more other servers. For instance, the server(s) can transmit the flag(s) to the other server(s), which may be located in one or more other networks from among the network(s). In such an instance or another instance, the server(s) can transmit the flag(s) to the other server(s) in the other network(s), to inform one or more other service providers that the individual ones of the UE(s) 102 have been identified as the possible malicious UE(s) 104. In various cases, the other network(s) can include an originating network, such as a network to which a UE 102 that has been identified as a possible malicious UE 104 is communicatively connected.

In some examples, the server(s) can transmit the flag(s) (or "anti-spam-oriented RCS capabilities related flag(s)") in one or more communications (or "response communication(s)") in response to receiving the subsequent RCS communication(s) initiated by the possible malicious UE(s) 104. In those or other examples, the flag(s) can be transmitted in one or more corresponding headers of the response communication(s). The flag(s), for instance, can be inserted in the header(s).

For instance, a flag can be set to identify a UE 102 that has been identified as a possible malicious UE 104. In such an instance or another instance, a flag that is not set can identify a UE 102 that has been identified as not being a possible malicious UE 104.

In some examples, individual ones of the header(s) can include a capabilities identifier, indicating that RCS capabilities have been removed and/or that the corresponding possible malicious UE(s) 104 do not have RCS capabilities. Alternatively or additionally, individual ones of the header(s) can include a spammer identifier, indicating that a corresponding possible malicious UE 104 has been identified as a spammer.

The capabilities identifier(s) and/or the spammer identifier(s) can have any of values associated with different corresponding statuses, and/or including information associated with the corresponding identifier(s). Individual ones of capabilities identifier(s) can have a value (e.g., text, a boolean value, etc., or any combination thereof) associated with no RCS capabilities, or a value (e.g., text, a boolean value, etc., or any combination thereof) associated with RCS capabilities. Individual ones of capabilities identifier(s) can have a value (e.g., text, a boolean value, etc., or any combination thereof) associated with a spammer, or a value (e.g., text, a boolean value, etc., or any combination thereof) associated with a non-spammer.

Although the flag(s) can be generated, as discussed above in the current disclosure, it is not limited as such. In some examples, one of more identifiers of various types can be utilized, additionally or alternatively, to the flag(s) and in a similar way as for the flag(s) for purposes of implementing any of the techniques discussed herein. The identifier(s) can include source content, destination content, any other content associated with the subsequent RCS communication(s) initiated by the possible malicious UE(s) 104, and/or any combination thereof.

Although the network analysis can be performed utilizing the ML model and/or the algorithm, as discussed above in the current disclosure, it is not limited as such. In some examples, one or more models, such as the ML model, one or more other ML models of various types, one or more other models of various types, one or more rules engine models, or any combination thereof, can be utilized to perform the network analysis. The other model(s), the other ML model(s), the rules engine model(s), etc., can be model(s) of various types, such as any of various types of ML models and/or various types of AI models, other types of models, or any combination thereof. Any of the other model(s) may be similar to, or different from, the ML model as discussed above. In those or other examples, one or more algorithms, such as the algorithm, one or more other algorithms of various types, or any combination thereof, can be utilized to perform the network analysis. Any of the other algorithms(s) may be similar to, or different from, the algorithm as discussed above.

Although the term "network analysis" is utilized for clarity and simplicity to refer to the network analysis being performed to identify the malicious UE(s), as discussed above in the current disclosure, it is not limited as such. In some examples, one or more network analyses can be performed by any number of various types of models in a similar way as the network analysis, discussed above. In those or other examples, the term "network analysis" as it occurs throughout the disclosure can be interpreted as including the network analyses(s), which can be utilized to implement any of the techniques as discussed herein.

In various cases, the analyses(is) can be utilized to identify the possible malicious UE(s) 104, and/or to identify one or more malicious UE(s) from among the UE(s) 102 and/or the possible malicious UE(s) 104. In such an example or another example, the network analyses(is) utilized to identify the malicious UE(s) can be further utilized to identify whether individual ones of the possible malicious UE(s) 104 are the corresponding malicious UE(s) and/or whether individual ones of the possible malicious UE(s) 104 are being utilized to communicate spam and/or to exchange fraudulent communications.

In various cases, the network analyses(is) can be performed utilizing various model(s), such as the ML model(s), the algorithm(s), and/or the other model(s), such as the rules engine model(s), or any combination thereof. The network analyses(is) utilized to identify the malicious UE(s), such as from among the UE(s) 102, and/or, in particular, the possible malicious UE(s) 104, can be performed by monitoring and/or scanning the communication(s) associated with the UE(s) 102 and/or the possible malicious UE(s) 104. For instance, the network analyses(is) utilized to identify the malicious UE(s) can be performed by scanning the non-RCS communication(s) generated by the possible malicious UE(s) 104.

In some examples, a training dataset used to train the ML model(s) described herein can include features and labels. However, the training dataset may be unlabeled, in some examples. Accordingly, the ML model(s) described herein may be trained using any suitable learning technique, such as supervised learning, unsupervised learning, semi-supervised learning, reinforcement learning, and so on. The features included in the training dataset can be represented by a set of features, such as in the form of an n-dimensional feature vector of quantifiable information about an attribute of the training dataset.

In various cases, the ML model(s) used by the techniques and systems described herein may represent a single model or an ensemble of base-level ML models, and may be implemented as any type of ML model. For example, suitable ML models for use by the techniques and systems described herein include, without limitation, neural networks (e.g., generative adversarial networks (GANs), deep neural networks (DNNs), recurrent neural networks (RNNs), etc.), tree-based models (e.g., eXtreme Gradient Boosting (XGBoost) models), support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), multilayer perceptrons (MLPs), expectation maximization, genetic algorithms, linear regression algorithms, nonlinear regression algorithms, logistic regression-based classification models, or an ensemble thereof. An "ensemble" can comprise a collection of ML models whose outputs (predictions) are combined, such as by using weighted averaging or voting. The individual ML models of an ensemble can differ in their expertise, and the ensemble can operate as a committee of individual ML models that is collectively "smarter" than any individual ML model of the ensemble.

In some examples, the network analysis utilized to identify the malicious UE(s) can include scanning the communication(s), such as the non-RCS communication(s), associated with the possible malicious UE(s) 104. In those or other examples, the network analysis utilized to identify the malicious UE(s) can include scanning the communication(s) the non-RCS communication(s), based on the non-RCS communication(s) being unencrypted. For instance, with such examples in which the unencrypted non-RCS communication(s) are scanned, the network analysis utilized to identify the malicious UE(s) can include scanning one or more text messaging communications associated with the possible malicious UE(s) 104.

The network analysis utilized to identify the malicious UE(s) can include scanning one or more unencrypted communications of various types associated with the possible malicious UE(s) 104. For example, with examples in which the unencrypted communication(s) being exchanged include the text messaging communication(s), the network analysis utilized to identify the malicious UE(s) can include scanning the text messaging communication(s). In various cases, the network analysis utilized to identify the malicious UE(s) can include scanning the text messaging communication(s) associated with the possible malicious UE(s) 104, such as one or more short messaging service (SMS) communications, one or more multimedia messaging service (MMS) communications, one or more other unencrypted communications of various types, or any combination thereof.

The network analysis utilized to identify the malicious UE(s) can include scanning the unencrypted communication(s) to identify one or more characteristics of the unencrypted communication(s). For example, the characteristic(s) of the unencrypted communication(s) can include one or more fraudulent oriented characteristics and/or spam-oriented characteristics. In some cases, the fraudulent and/or spam oriented characteristic(s) can include uniform resource locators (URLs) known to be fraudulent and/or spam, text patterns identified as being likely to be associated with fraud and/or spam, usages of words identified as being likely to be associated with fraud and/or spam, sources (e.g., data and/or identifiers associated with accounts, sources, and/or devices, etc., of the sources) and/or destinations (e.g., data and/or identifiers associated with accounts, sources, and/or devices, etc., of the destinations), which are indicated within, and/or identified as being associated with, the unencrypted communication(s), and/or which are known to be fraudulent, and/or which are identified as being likely to be associated with, spam, and so on, or any combination thereof.

One or more actions can be taken based on individual ones of the possible malicious UE(s) 104 being identified as malicious UE(s). In some examples, the action(s) can include flagging one or more communications (or "subsequent communication(s)") of various types being exchanged based on the possible malicious UE(s) 104 being identified as the malicious UE(s). In those or other examples, the action(s) can include the server(s) flagging the malicious UE(s) and/or the subsequent communication(s) associated with the malicious UE(s). The flagging can be performed in response to the identifying of individual ones of the possible malicious UE(s) 104 as the malicious UE(s). In some cases, he server(s) flagging the subsequent communication(s) associated with the malicious UE(s) can include the server(s) flagging individual ones of the subsequent communica tion(s) identified as being fraudulent and/or spam.

In various cases, such as with examples in which the server(s) flag the malicious UE(s) and/or the subsequent communication(s) associated with the malicious UE(s), the server(s) can generate one or more flags indicating that individual ones of the possible malicious UE(s) 104 as the malicious UE(s). In those or other examples, the server(s) can generate one or more flags indicating that the subsequent communication(s) associated with the malicious UE(s) 104 have been identified as fraudulent communication(s) (e.g., spam).

In various cases, such as with examples in which the flag(s) are generated by the server(s), the server(s) can transmit the flag(s) to one or more other servers. For instance, the server(s) can transmit the flag(s) to the other server(s), which may be located in one or more other networks from among the network(s). In such an instance or another instance, the server(s) can transmit the flag(s) to the other server(s) in the other network(s), to inform one or more other service providers that the individual ones of the possible malicious UE(s) 104 have been identified as the malicious UE(s).

In some examples, the server(s) can transmit the flag(s) in one or more communications (or "response communication(s)") in response to receiving the subsequent communication(s) generated by the malicious UE(s). In those or other examples, the flag(s) can be transmitted in one or more corresponding headers of the response communication(s).

Although the flag(s) in response to the initiating by the malicious UE(s) of the subsequent communication(s) can be generated, as discussed above in the current disclosure, it is not limited as such. In some examples, one of more identifiers of various types can be utilized, additionally or alternatively, to the flag(s) and in a similar way as for the flag(s) for purposes of implementing any of the techniques discussed herein. The identifier(s) can include source content, destination content, any other content associated with the communication(s) initiated by the malicious UE(s), and/or any combination thereof.

Although the action(s) in response to the initiating by the possible malicious UE(s) 104 of the subsequent RCS communication(s) and/or the action(s) in response to the initiating by the malicious UE(s) of the subsequent communication(s) can be generated, as discussed above in the current disclosure, it is not limited as such. In various cases, any of the action(s) associated with the malicious UE(s) can be the same as, or different from, any of the action(s) associated with the possible malicious UE(s) 104.

Although the network analysis utilized to identify the malicious UE(s) can be performed utilizing the various model(s), as discussed above in the current disclosure, it is not limited as such. In some examples, one or more other models, including the rules engine model one or more other models of various types, or any combination thereof, can be utilized in a similar way as for the model(s) utilized to identify the malicious UE(s), as discussed above, to implement any of the techniques discussed herein. Any of the other model(s) may be similar to, or different from, the model(s) (e.g., the rules engine model) utilized to identify the malicious UE(s), as discussed above.

Although the term "UE(s)" is utilized for purposes of clarity and simplicity, and the environment 100 can include the UE(s) 102 and/or the possible malicious UE(s) 104, as discussed above in the current disclosure, it is not limited as such. In various examples, the environment 100 can include any of one or more devices of any types utilized in a similar way as the UE(s) 102 and/or the possible malicious UE(s) 104. For instance, the device(s) can include a mobile phone, a personal computer, a tablet, a vehicle, or any other device that can use a mobile or cellular network. In some examples, individual ones of the service provider(s) may be an online or Internet/web-based platform that requires a user to log in and that is any of one or more types of platforms, such as an ecommerce platform, a billing platform, or the like.

Although the terms "spam" and "fraud" are utilized for purposes of simplicity and ease of explanation throughout the current disclosure, it is not limited as such. In various examples, the terms "spam" and "fraud" can be interpreted as being interchangeable, and/or as including any types of spam and/or fraud related content.

In various cases, spam can include unsolicited, possibly commercial messages (e.g., emails, text messages, Internet postings, or any combination thereof) sent to a large number of the UE(s) 102. In those or other cases, fraud can include phishing communications, other types of fraud communications, or any combination thereof, such as communications (e.g., "fake" text messages) generated by devices of scammers to trick users of the UE(s) 102 into providing personal information.

Although the terms "possible malicious UE(s)" and "malicious UE(s)" are utilized for purposes of clarity and simplicity throughout the disclosure, it is not limited as such. In various examples, the terms "possible malicious UE(s)" and "malicious UE(s)" can be interpreted as being interchangeable.

Although the term "communication(s)" is utilized for purposes of clarity and simplicity throughout the current disclosure, it is not limited as such. In various examples, the term "communication(s)" may be interpreted as being interchangeable with the term "message(s)," "signal(s)," and/or, as appropriate, "reply," "response," "transmission," etc. In various examples, a communication may include any of various types of signaling protocol communications. For instance, a signaling protocol communication may include an RCS communication, an SMS communication, an MMS communication, etc.

Figure 2:
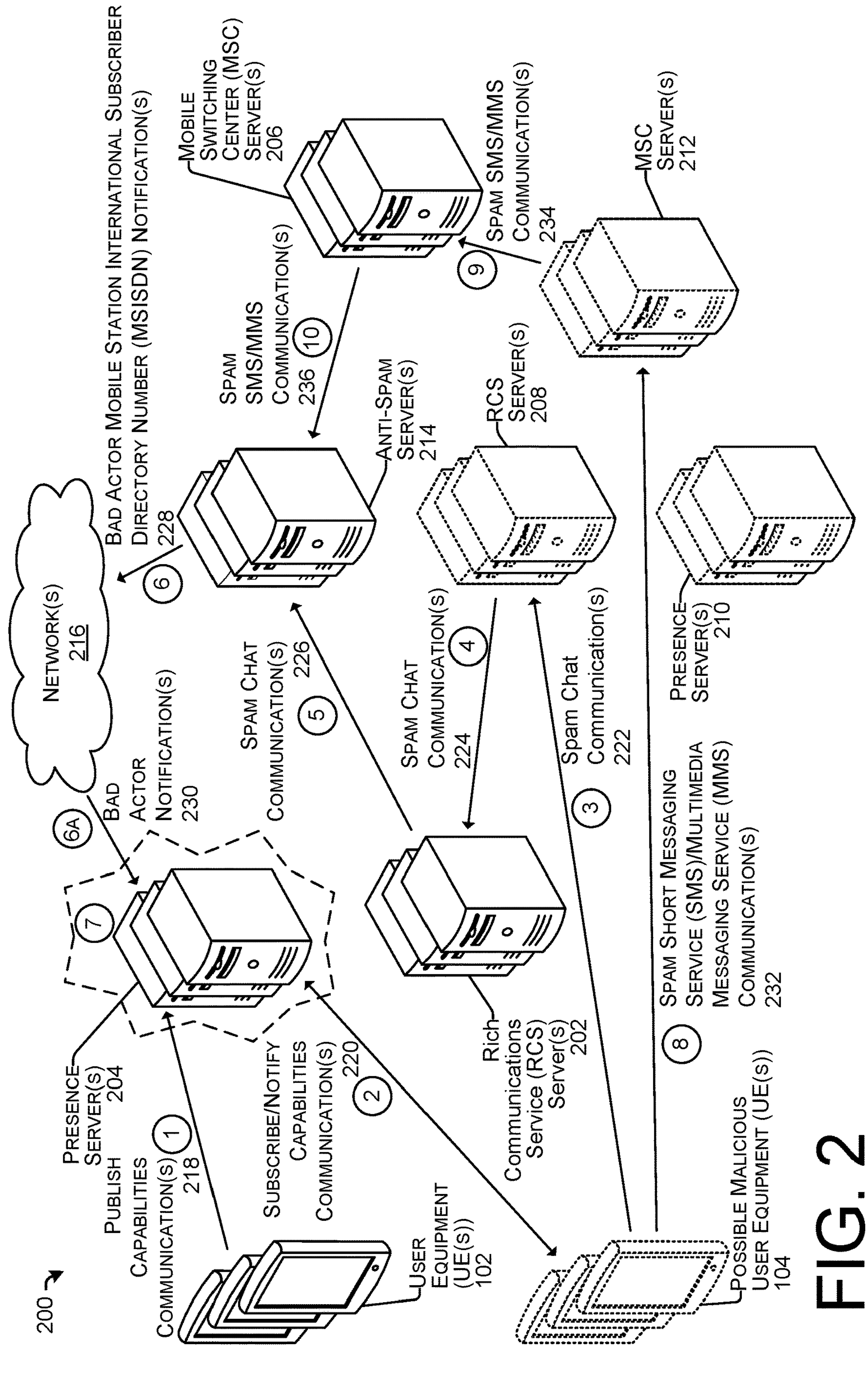
FIG. 2 schematically illustrates an example environment including servers for analyzing network traffic, identifying possible malicious user equipment (UEs), and downgrading the possible malicious UEs from having rich communication services (RCS) capabilities to non-RCS capabilities.

FIG. 2 schematically illustrates an example environment 200 including servers for analyzing network traffic, identifying possible malicious user equipment (UEs), and downgrading the possible malicious UEs from having rich communication services (RCS) capabilities to non-RCS capabilities.

In various examples, the environment 200 can include the servers, which can include one or more communications management servers, one or more presence servers, one or more mobile switching center (MSC) servers, one or more other servers of various types, or any combination thereof. The communications management server(s) can include one or more RCS servers 202 utilized as part of a network, the network being one of the network(s) to which individual ones of one or more user equipment (e.g., the UE(s) 102, as discussed above with reference to FIG. 1) may be communicatively coupled (or "communicative connected"). The presence server(s) can include one or more presence servers 204 utilized as part of the network to which individual ones of the UE(s) 102 may be communicatively connected. The MSC server(s) can include one or more MSC servers 206 utilized as part of the network to which individual ones of the UE(s) 102 may be communicatively connected.

In various examples, the communications management server(s) can include one or more RCS servers 208 utilized as part of a network, the network being one of the network(s) to which individual ones of one or more user equipment, such as the possible malicious UE(s) 104, as discussed above with reference to FIG. 1, may be communicatively connected. The presence server(s) can include one or more presence servers 210 utilized as part of the network to which individual ones of the possible malicious UE(s) 104 may be communicatively connected. The MSC server(s) can include one or more MSC servers 212 utilized as part of the network to which individual ones of the possible malicious UE(s) 104 may be communicatively connected.

The servers in the environment 200 can further include one or more anti-spam servers 214. For example, as discussed below in further detail, the anti-spam server(s) 214 can be utilized to manage the communication(s) associated with the possible malicious UE(s) 104.

In various examples, the RCS server(s) 202, the presence server(s) 204, the MSC server(s) 206, the RCS server(s) 208, the presence server(s) 210, the MSC server(s) 212, and/or the anti-spam server(s) 214 may be utilized to implement the server(s) in the environment 100. For instance, the RCS server(s) 202 and/or the RCS server(s) 208 may be utilized to implement the communication management server(s) 106. In such an instance or another instance, the presence server(s) 204 and/or the presence server(s) 210 may be utilized to implement the presence server 108.

In various examples, the network(s) to which the possible malicious UE(s) 104 may be communicatively connected may include one or more networks 216. For instance, the network(s) 216 may include one or more cellular networks (or "telecommunications network(s)"), one or more social media networks, one or more partner networks, one or more other networks of other types, or any combination thereof, to which one or more UEs (e.g., non-malicious UE(s)) from among the UE(s) 102 are communicatively connected. In such an instance or another instance, the network(s) 216 may include one or more cellular networks, one or more social media networks, one or more partner networks, one or more other networks of other types, or any combination thereof, to which one or more possible malicious UEs from among the possible malicious UE(s) 104 are communicatively connected.

Although the network(s) can include the network to which individual ones of the UE(s) 102 may be communicatively connected and/or the network to which the possible malicious UE(s) 104 may be communicatively connected, as discussed above in the current disclosure, it is not limited as such. In some examples, the non-malicious UEs from among the UE(s) 102 may be communicatively connected to one or more networks in a similar way as for the network as discussed above, for purposes of implementing any of the techniques as discussed herein. In those or other examples, the possible malicious UE(s) 104 may be communicatively connected to one or more networks in a similar way as for the network as discussed above, for purposes of implementing any of the techniques as discussed herein. The network(s) to which the non-malicious UEs from among the UE(s) 102 are communicatively connected may be the same as, or different from, the network(s) to which the possible malicious UE(s) 104 are communicatively connected.

In some examples, the possible malicious UE(s) 104 may be communicatively coupled to the RCS server(s) 208, the presence server(s) 210, and/or the MSC server(s) 212, for example, as represented by dotted lines indicating the communicative connection(s) to the possible malicious UE(s) 104. In those or other examples, the possible malicious UE(s) 104 being communicatively coupled to the RCS server(s) 208, the presence server(s) 210, and/or the MSC server(s) 212 may include the possible malicious UE(s) 104 being communicatively coupled to a network (e.g., another network than the network to which the non-malicious UEs from among the UE(s) 102 are communicatively coupled) utilizing the RCS server(s) 208, the presence server(s) 210, and/or the MSC server(s) 212. The network to which the possible malicious UE(s) 104 are communicatively coupled may be operated by a same, or a different service provider, from the network to which the non-malicious UEs from among the UE(s) 102 are communicatively coupled.

In some examples the UE(s) 102 may be communicatively coupled to the RCS server(s) 208, the presence server(s) 210, and/or the MSC server(s) 212, for example, as represented by solid lines indicating the communicative connection(s) to the UE(s) 102. In those or other examples, the UE(s) 102 being communicatively coupled to the RCS server(s) 208, the presence server(s) 210, and/or the MSC server(s) 212 may include the UE(s) 102 being communicatively coupled to a network utilizing the RCS server(s) 208, the presence server(s) 210, and/or the MSC server(s) 212.

Although various UE(s) may be communicatively coupled to various servers of the environment 200, as discussed above in the current disclosure, it is not limited as such. In various examples, individual ones of the UE(s) 102 and/or individual ones of the possible malicious UE(s) 104 may be communicatively coupled to any of the servers of the environment 200.

One or more actions may occur in the environment 200, and/or utilizing the environment 200 and/or any of the components (e.g., devices) therein. The action(s) can include one or more of actions (1)-(9), as represented in FIG. 2 by corresponding numerals that are encircled.

In various cases, the action(s) may include one or more publish capabilities communication actions (1), such as one or more exchanges of one or more publish capabilities communications 218. In some examples, individual ones of the UE(s) 102 may be utilized to transmit the publish capabilities communication(s) 218. In those or other examples, the publish capabilities communication(s) 218 may include one or more session initiation protocol (SIP) publish communications. The SIP publish communication(s) may be utilized by the UE(s) 102 to report content to the servers, such as the presence server(s) 204.

For instance, the UE(s) 102 may be utilized to transmit the publish capabilities communication(s) 218 to report that one or more capabilities (e.g., one or more capability identifiers) of the UE(s) 102 include rich communication services (RCS) capabilities, and likely, also short messaging service (SMS) capabilities and/or multimedia messaging service (MMS) capabilities. In such an instance or another instance, the UE(s) 102 may be utilized to perform the publish capabilities communication(s) 218 to create, modify, and/or remove a state to the presence server(s) 204. The state may include a call event state (e.g., a communication session state). Prior to being stripped of RCS capabilities, the possible malicious UE(s) 104 may also exchange publish capabilities communication(s) indicating RCS capabilities, and/or likely SMS/MMS capabilities.

In various cases, the action(s), may include one or more subscribe/notify capabilities communication actions (2), such as one or more exchanges of one or more subscribe/notify capabilities communications 220. In some examples, individual ones of the UE(s) 102 and/or individual ones of the possible malicious UE(s) 104 may be utilized to exchange one or more subscribe/notify capabilities communications. For instance, the UE(s) 102, such as the possible malicious UE(s) 104 and/or non-malicious UE(s) 102, may be utilized to transmit the subscribe/notify capabilities communication(s) 220. In such an instance or another instance, the subscribe/notify capabilities communication(s) 220 may include one or more subscribe communications transmitted by the possible malicious UE(s) 104.

In such an instance or another instance, the subscribe/notify capabilities communication(s) 220 may include one or more notify (or "notification") communications (or "notification(s)") transmitted by the presence server(s) 204. The subscribe communication(s) may be associated with one or more events and/or one or more resources (e.g., the capability(ies) associated with the UE(s) 102). For instance, individual ones of the subscribe communication(s) may be associated with one or more events and/or one or more resources associated with corresponding UEs from among the UE(s) 102. The notify communication(s) may be associated with the event(s) and/or the resource(s). For instance, individual ones of the notify communication(s) may be associated with the event(s) and/or the resource(s) associated with corresponding UEs from among the UE(s) 102.

In various examples, the subscribe/notify capabilities communication(s) 220 may include one or more SIP subscribe communications and/or one or more SIP notify communications. The subscribe communication(s) may include, for instance, the SIP subscribe communication(s). The notify communication(s) may include, for instance, the SIP notify communication(s). In some cases, the subscribe/notify capabilities communication(s) 220 may include the SIP subscribe communication(s) being transmitted by one or more UEs, such as the possible malicious UE(s) 104, to request the SIP notify communication(s). For instance, the SIP subscribe communication(s) may be utilized by the possible malicious UE(s) 104 to request the SIP notify communication(s) associated with the event(s) and/or the resource(s).

The subscribe/notify capabilities communication(s) 220 may include the SIP notify communication(s) being transmitted by the presence server(s) 204. The SIP notify communication(s) may be transmitted to the UE(s) 102, such as the possible malicious UE(s) 104 and/or non-malicious UE(s) 102, based on the SIP subscribe communication(s). The SIP notify communication(s) may include the capability(ies) of the UE(s) 102.

In various cases, the subscribe/notify capabilities communication(s) 220 may include the SIP subscribe capabilities communication(s) and/or the SIP notify capabilities communication(s) being exchanged with the UE(s) 102, such as the possible malicious UE(s) 104 and/or the non-malicious UE(s) 102. For instance, the SIP subscribe capabilities communication(s) and/or the SIP notify capabilities communication(s) may be exchanged with the UE(s) 102, via the presence server(s) 204 and/or one or more other servers.

In various cases, the subscribe/notify capabilities communication(s) 220 may be utilized by the UE(s) 102 to perform the subscribe/notify capabilities action(s). For example, the UE(s) 102 may be utilized to perform the subscribe/notify capabilities communication(s) 220, which may include performing an SIP subscribe action. The SIP subscribe action(s) can include transmitting one or more subscribe communications. The subscribe communication(s) can be transmitted to request one or more notify (or "notification") communications (or "notification(s)") associated with one or more events and/or one or more resources (e.g., the capability(ies) associated with the UE(s) 102).

In various cases, the action(s), can include one or more spam chat communication (3) actions, such as one or more spam chat communications 222. In some examples, individual ones of the UE(s) 102, such as the possible malicious UE(s) 104 and/or non-malicious UE(s) 102, may be utilized to generate, and possibly transmit, the spam chat communication(s) 222. The spam chat communication(s) 222 may be transmitted to corresponding UE(s) 102. The spam chat communication(s) may be transmitted via the RCS server(s) 208.

In various cases, the action(s), may include one or more spam communication actions (4), such as one or more exchanges of one or more spam chat communications 224. The spam chat communication(s) 224 may include, be the same as, and/or be transmitted based on, the spam chat communication(s) 222. In some examples, the RCS server(s) 208 may be utilized with the RCS server(s) 202 to exchange the spam chat communication(s) 224. For instance, the RCS server(s) 208 may be utilized to route the spam chat communication(s) 224 to the RCS server(s) 202. In such an instance or another instance, the spam chat communication(s) 224 may include one or more spam RSC chat communications transmitted by the possible malicious UE(s) 104 and to the RCS server(s) 202, via the RCS server(s) 208. For example, the spam chat communication(s) 224 transmitted by the possible malicious UE(s) 104 may be routed by the RCS server(s) 208 and to the RCS server(s) 202.

In various cases, the action(s), can include one or more spam communication actions (5), such as one or more exchanges of one or more spam chat communications 226. The spam chat communication(s) 226 may include, be the same as, and/or be transmitted based on, the spam chat communication(s) 222 and/or the spam chat communication(s) 224. In some examples, the anti-spam server(s) 214 may be utilized with the RCS server(s) 208 and/or the RCS server(s) 202 to exchange the spam chat communication(s) 224. For instance, the RCS server(s) 202 may be utilized to route the spam chat communication(s) 226 to the anti-spam server(s) 214. In such an instance or another instance, the spam chat communication(s) 226 may include one or more spam RSC chat communications transmitted by the possible malicious UE(s) 104 and to anti-spam server(s) 214, and via the RCS server(s) 208 and/or the RCS server(s) 202. For example, the spam chat communication(s) 226 transmitted by the possible malicious UE(s) 104 may be routed by the RCS server(s) 208 and the RCS server(s) 202, and to the anti-spam server(s) 214.

In various cases, the anti-spam server(s) 214, and/or any others of the server(s) of the environments 100 and/or 200, can perform any analysis of the UE(s) 102, such as the analyses as discussed above with reference to FIG. 1. For example, the anti-spam server(s) 214 can analyze the spam chat communication(s) 226. Analysis by the anti-spam server(s) 214 can be performed in a similar way as analysis of the communication(s) associated with the possible malicious UE(s) 104, such as by one more models, algorithms, etc., as discussed above with reference to FIG. 1. The communication(s) associated with the possible malicious UE(s) 104 being analyzed by the anti-spam server(s) 214 can include the spam chat communication(s) 226 and/or one or more other types of communications associated with the UE(s) 102 and/or the possible malicious UE(s) 104.

In some examples, the results of the analysis of the communication(s) associated with the possible malicious UE(s) 104 can be utilized to identify individual ones of the possible malicious UE(s) 104 as corresponding malicious UE(s). The anti-spam server(s) 214 can identify identifier data associated with the malicious UEs, and utilize the identifier data to block, flag, and/or exchange communication(s), in a similar way as discussed above with reference to FIG. 1.

In various cases, the action(s), can include one or more bad actor mobile station international subscriber directory number (MSISDN) notification actions (6), such as exchanges of one or more bad actor MSISDN notifications 228. The communication(s) transmitted by the anti-spam server(s) 214 can include one or more communications indicating individual UE(s), such as individual ones of UE(s) 102, as corresponding UE(s) (e.g., corresponding possible malicious UE(s)) of the possible malicious UE(s) 104. The communication(s) indicating the possible malicious UE(s) (e.g., indicating individual UE(s), such as individual ones of the UE(s) 102, as corresponding possible malicious UE(s) 104) can include the bad actor MSISDN notifications 228. Individual ones of the bad actor MSISDN notifications 228 being exchanged can identify corresponding UE(s) (e.g., possible malicious UE(s)), such as from among the UE(s) 102, as corresponding possible malicious UE(s) 104.

The bad actor MSISDN notifications 228 can be transmitted to the network(s) 216 and/or individual ones of any devices of the environment 200. The network(s) 216 can utilize the bad actor MSISDN notifications 228 to control communication(s) associated with the possible malicious UE(s) 104.

In various cases, the action(s), can include one or more bad actor notification actions (or "possible bad actor notification action(s)") (6*a*), such as exchanges of one or more bad actor notifications 230. The communication(s) transmitted by the network(s) 216 can include one or more communications indicating individual ones of the possible malicious UE(s) 104. The communication(s) indicating malicious UE(s) (e.g., indicating individual ones of the possible malicious UE(s) 104) can include the bad actor MSISDN notifications 228 associated with the possible malicious UE(s) 104, respectively. Individual ones of the bad actor MSISDN notifications 228 being exchanged can identify corresponding UE(s) (e.g., corresponding malicious UE(s)) of among the possible malicious UE(s) 104.

In various cases, the action(s), can include one or more notify capabilities strip actions (7), such as one or more operations stripping the possible malicious UE(s) 104 of RCS capabilities. Based on the RCS capabilities being stripped, the possible malicious UE(s) 104 may have fewer capabilities than a UE 102 that has RCS capabilities. The operation(s) stripping the possible malicious UE(s) 104 of RCS capabilities can include individual ones of the operation(s) stripping corresponding UE(s) (e.g., corresponding possible malicious UE(s)) of the possible malicious UE(s) 104 of RCS capabilities.

In some examples, the operation(s) stripping the possible malicious UE(s) 104 of RCS capabilities can be utilized to exchange one or more notify communications of the RCS capabilities being stripped. In those or other examples, individual ones of the operation(s) stripping the corresponding possible malicious UE(s) 104 of RCS capabilities can be utilized to exchange one or more corresponding notify communications of the RCS capabilities being stripped.

In various cases, the notify communication(s) of the RCS capabilities being stripped can be transmitted by the presence server(s) 204 and to the possible malicious UE(s) 104. For instance, individual ones of the notify communication(s)

of the RCS capabilities being stripped can be transmitted by the presence server(s) 204 and to the corresponding possible malicious UE(s) 104.

In some examples, the notify communication(s) of the RCS capabilities being stripped can omit any details associated with the possible malicious UE(s) 104 having been identified as possible malicious UE(s). By omitting the details, any detection by the possible malicious UE(s) 104, and/or awareness of the corresponding user(s), that the possible malicious UE(s) 104 have been identified as such can be delayed as long as possible.

For instance, by delaying the detection by the possible malicious UE(s) 104, and/or the awareness of the corresponding user(s) of the possible malicious UE(s) 104, that the possible malicious UE(s) 104 have been identified, non-spam related operations may continue. For example, because the difficulty of identifying whether RCS communications that are encrypted are spam and/or fraud related may be greater than the difficulty of identifying whether SMS/MMS communications are spam and/or fraud related, accuracy of blocking and/or flagging of communications may be improved by blocking and/or flagging the SMS/MMS communications that are spam and/or fraud related. The accuracy of blocking and/or flagging of communications may be improved by blocking and/or flagging the SMS/MMS communications that are identified as being spam and/or fraud related, instead of blocking and/or flagging the RCS communications that are identified as possibly being spam and/or fraud related.

By allowing the operations and/or the SMS/MMS communications of the possible malicious UE(s) 104 to continue, a likelihood of any subsequent changes and/or modifications associated with the possible malicious UE(s) 104, such as behavior changes, operations changes, modifications of how communication(s) are being generated, modifications of how operations are being conducted, and/or any other changes and/or modifications, subsequent complex and/or unpredictable behavior and/or operations, and/or modifications and/or changes thereof, of the possible malicious UE(s) 104 may be reduced. For example, by reducing the likelihood of any subsequent changes and/or modifications associated with the possible malicious UE(s) 104, the difficulty of detecting subsequent behavior and/or operations (e.g., subsequent spam and/or fraud related behavior and/or operations) of the possible malicious UE(s) 104 may be reduced and/or minimized. In such an example or another example, the difficulty of monitoring and/or scanning subsequent communications (e.g., subsequent SMS/MMS communication(s)) of the possible malicious UE(s) 104 may be minimized.

Although allowing the operations and/or the SMS/MMS communications of the possible malicious UE(s) 104 to continue may result in relatively minor immediate changes to amounts of spam and/or fraud, future and/or overall amounts of spam and/or fraud may be reduced. Allowing the operations and/or the SMS/MMS communications of the possible malicious UE(s) 104 to continue allows non-spam and/or non-fraud related communications to be exchanged. Blocking and/or flagging of non-spam and/or non-fraud related communications based on false positive detections of the possible malicious UE(s) 104 as being malicious UE(s) may be reduced. Allowing the operations and/or the SMS/MMS communications of the possible malicious UE(s) 104 to continue allows non-spam and/or non-fraud related operations to be performed.

By allowing the SMS/MMS communications of the possible malicious UE(s) 104 to be exchanged, the subsequent communications (e.g., subsequent SMS/MMS communication(s)) of the possible malicious UE(s) 104 may be monitored and/or scanned to learn about how the subsequent communications (e.g., subsequent SMS/MMS communication(s)) are being generated by the possible malicious UE(s) 104. By allowing the SMS/MMS related operations of the possible malicious UE(s) 104 to be performed, the subsequent operations (e.g., subsequent SMS/MMS operations) of the possible malicious UE(s) 104 may be monitored and/or scanned to learn about how the subsequent operations are being performed by the possible malicious UE(s) 104. For example, information can be gathered and utilized to detect individual ones of the possible malicious UE(s) 104 as corresponding malicious UE(s) more accurately. The information gathered can be utilized to more accurately detect whether SMS/MMS communications are spam and/or fraud related. By more accurately detecting whether SMS/MMS communications are spam and/or fraud related, individual ones of the possible malicious UE(s) 104 transmitting the spam and/or fraud related SMS/MMS communications can be more accurately and/or effectively identified as corresponding malicious UE(s). The subsequent spam and/or fraud related communication(s) (e.g., the subsequent spam and/or fraud related SMS/MMS communication(s)) of the malicious UE(s) and/or their user(s) may be more easily blocked and/or flagged.

By gathering the information about the possible malicious UE(s) 104 and/or the users (e.g., user account and/or identifier information, etc.) thereof, subsequent spam and/or fraud related operations (e.g., subsequent spam and/or fraud related SMS/MMS operations) utilized by the possible malicious UE(s) 104 may be detected. Detection of the subsequent spam and/or fraud related SMS/MMS operations) utilized by the possible malicious UE(s) 104 may be utilized to identify in the future the possible malicious UE(s) 104 as corresponding malicious UE(s). By identifying in the future, the possible malicious UE(s) 104 as the corresponding malicious UE(s), operations and/or communications (e.g., subsequent spam SMS/MMS related operations) associated with the malicious UE(s) may be blocked and/or flagged.

The analysis can be utilized to monitor and/or scan network traffic to improve network operations, such as exchanging of communications. For example, the analysis can include scanning RCS communications being exchanged, and/or RCS operations being performed. By gathering the information about the possible malicious UE(s) 104 and/or the users thereof, and/or the information about the malicious UE(s) and/or the users thereof, other UE(s) 102 and/or their RCS operations may be monitored and scanned more effectively in the future. The information being gathered may include information about malicious network traffic associated with the possible malicious UE(s) 104. For example, the analysis of future operations (e.g., RCS operations) and/or communications (e.g., RCS communications) may be improved. In some instances, the analysis of future operations (e.g., RCS operations) and/or communications (e.g., RCS communications) may be improved by modifying and/or improving the algorithm(s) and/or model(s).

The algorithm(s) and/or model(s) utilized in the future to monitor and/or detect the possible malicious UE(s) 104, and/or the RCS communications thereof, may be improved based on the information (e.g., the information about the spam and/or fraud related SMS/MMS communications) gathered about the SMS/MMS communications and/or operations. In those or other examples, the algorithm(s) and/or model(s) utilized in the future to monitor and/or detect the possible malicious UE(s) 104, and/or the RCS communications thereof, may be improved based on the information (e.g., the information about the spam and/or fraud related SMS/MMS communications) gathered about the possible malicious UE(s) 104 identified as the malicious UE(s). The algorithm(s) and/or model(s) utilized in the future to monitor and/or detect the possible malicious UE(s) 104, and/or the RCS communications thereof, may be improved based on the information (e.g., the information about the spam and/or fraud related SMS/MMS communications) gathered about the users of the possible malicious UE(s) 104 identified as the malicious UE(s).

The UE(s) in the future that utilized to perform spam and/or fraud related operations (e.g., spam and/or fraud related RCS operations) may be more easily identified utilizing the improved analysis based on information gathered about the possible malicious UE(s) 104 being downgraded (e.g., being stripped of RCS capabilities). For example, the modified and/or improved analysis, utilizing algorithm(s) and/or model(s) being modified and/or improved, can be utilized to more easily identify in the future the malicious UE(s) being reused, other UE(s) 102 that are related to the previously identified and/or detected possible malicious UE(s) 104, other UE(s) 102 that are unrelated to the previously identified and/or detected possible malicious UE(s) 104.

In various cases, the action(s), may include one or more spam SMS/MMS communication actions (8), such as exchanges of one or more SMS/MMS communications 232. For example, the SMS/MMS communication(s) 232 can include the SMS/MMS communication(s) utilized to identify individual ones of the possible malicious UE(s) 104 as the corresponding malicious UE(s), as discussed above. In such an example or another example, the SMS/MMS communication(s) 232 may include the SMS/MMS communication(s) transmitted by the possible malicious UE(s) 104, based on the RCS capabilities being stripped for individual ones of the possible malicious UE(s) 104, therefore rendering them unable to transmit RCS communications. In such an example or another example, the SMS/MMS communication(s) 232 may include the SMS/MMS communication(s) transmitted to the MSC server(s) 212.

In various cases, the action(s), may include one or more spam SMS/MMS communication actions (9), such as exchanges of one or more SMS/MMS communications 234. For example, the SMS/MMS communication(s) 234 can include the SMS/MMS communication(s) utilized to identify individual ones of the possible malicious UE(s) 104 as the corresponding malicious UE(s), as discussed above. In such an example or another example, the SMS/MMS communication(s) 234 may include the SMS/MMS communication(s) 232, and/or the SMS/MMS communication(s) transmitted by the possible malicious UE(s) 104. In such an example or another example, the SMS/MMS communication(s) 234 may include the SMS/MMS communication(s) 232 transmitted to the MSC server(s) 212.

In various cases, the action(s), may include one or more spam SMS/MMS communication actions (10), such as exchanges of one or more SMS/MMS communications 236. For example, the SMS/MMS communication(s) 236 can include the SMS/MMS communication(s) utilized to identify individual ones of the possible malicious UE(s) 104 as the corresponding malicious UE(s), as discussed above. In such an example or another example, the SMS/MMS communication(s) 236 may include, and/or may be transmitted and/or routed based on, the SMS/MMS communication(s) 234, the SMS/MMS communication(s) 232, and/or the SMS/MMS communication(s) transmitted by the possible malicious UE(s) 104. In such an example or another example, the SMS/MMS communication(s) 236 may include, and/or may be transmitted and/or routed based on, the SMS/MMS communication(s) 232 transmitted to the MSC server(s) 212.

Although the various action(s) (e.g., flagging, bocking, reporting, etc.) may be utilized for the possible malicious UE(s) 104, as discussed above in the current disclosure, it is not limited as such. In some examples, the action(s) can be performed to modify capabilities associated with various types of communications of any types and not with various types of other communications of any types. For example, the actions can include flagging, bocking, reporting, etc., or any combination thereof, chats (e.g., chat messages) for a UE 102 identified as a possible malicious UE 104. In such an example or another example, the actions can include not flagging, bocking, reporting, etc., or any combination thereof, non-chats (e.g., non-chat messages, such as SMS/MMS texts, etc.) for the possible malicious UE 104.

In some cases, the actions can include not flagging, bocking, reporting, etc., or any combination thereof, chats (e.g., chat messages) for a UE 102 not identified as a possible malicious UE 104. For instance, the chats may be enabled, as a chat function, for the UE 102 not identified as a possible malicious UE 104.

In various examples, the actions can be utilized to control communications of the same type to have different capabilities based on whether the UE 102 is identified as a possible malicious UE 104. For instance, the actions can include, for a UE 102 identified as a possible malicious UE 104, flagging, bocking, reporting, etc., or any combination thereof, communications that have a size that is greater than a threshold size (e.g., 100 MB), and/or that include a file, and/or a number of files that is greater than a threshold number. For instance, the actions can include, for a UE 102 identified as not being a possible malicious UE 104, enabling the UE 102 to exchange communications that have a size that is greater than a threshold size (e.g., 100 MB), and/or that include a file, and/or a number of files that is greater than a threshold number. The file transfer being enabled may be utilized as a file transfer function.

In some instances, the actions can include, for a UE 102 identified as a possible malicious UE 104, flagging, bocking, reporting, etc., or any combination thereof, communications (e.g., group communications) being transmitted to a group of UE(s) based on a number of UE(s) in the group being greater than a threshold number. For instance, the actions can include, for a UE 102 identified as not being a possible malicious UE 104, enabling the UE 102 to exchange communications (e.g., group communications) being transmitted to a group of UE(s) based on a number of UE(s) in the group being greater than a threshold number. The group communications being enabled may be utilized as a group communications function (e.g., a group chat function).

Although the threshold size utilized for blocking and/or allowing the communications can be 100 MB, as discussed above in the current disclosure, it is not limited as such. In various examples, the threshold size can be 5 MB, 50 MB, 75 MB, 200 MB, or any other size.

Figure 3:
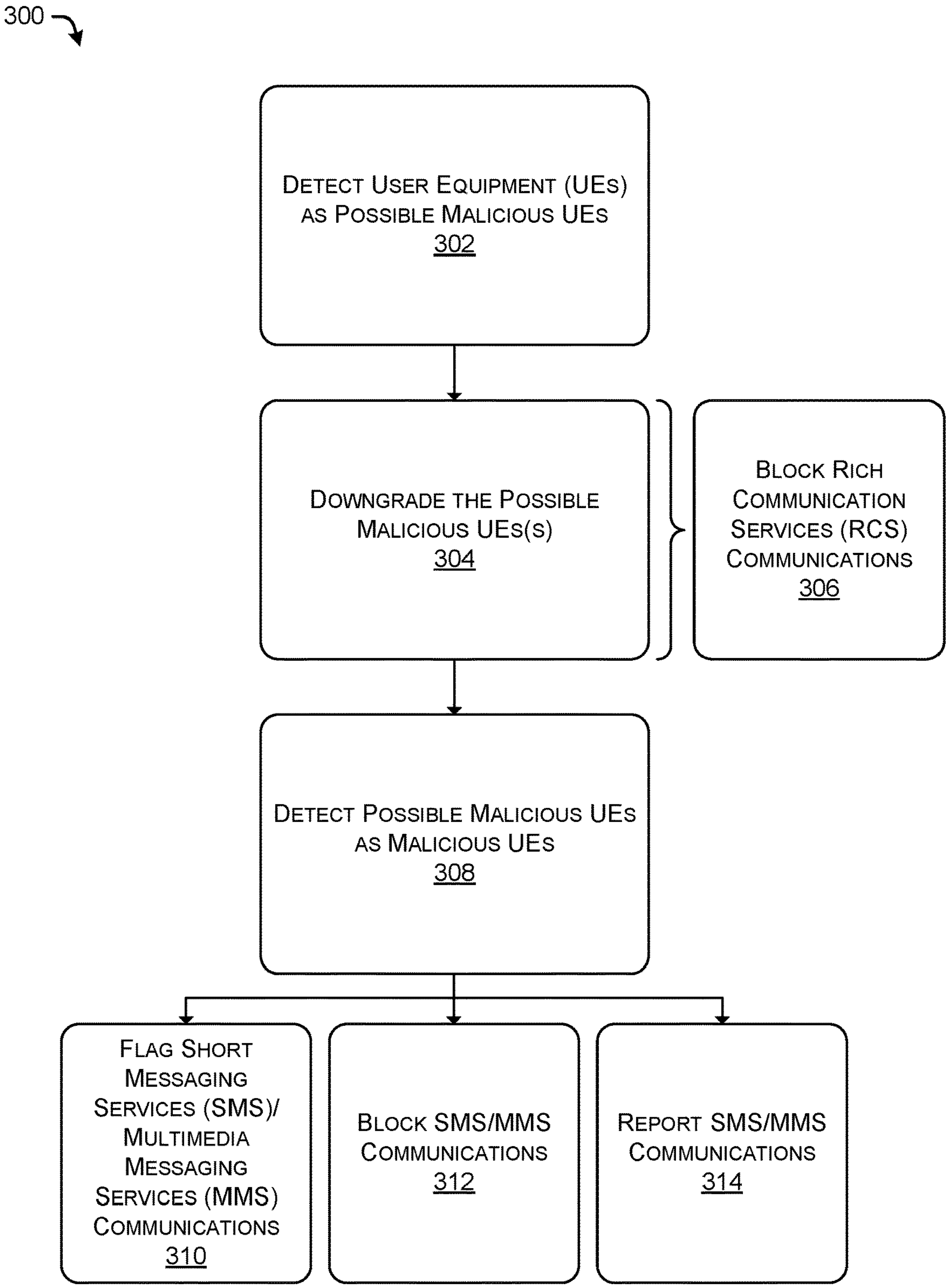
FIG. 3 is a flow diagram illustrating an example process of possible malicious user equipment (UE) detection-based rich communication services (RCS) capabilities downgrade management, and malicious UE detection and management.

FIG. 3 is a flow diagram illustrating an example process 300 of possible malicious user equipment (UE) detection-based rich communication services (RCS) capabilities downgrade management, and malicious UE detection and management. The process 300 can include detecting UEs as possible malicious UEs 302. For example, the detecting UEs as possible malicious UEs 302 can include detecting one or more UEs (e.g., the UE(s) 102 as discussed above with reference to FIG. 1) as one or more possible malicious UEs (e.g., the possible malicious UE(s) 104 as discussed above with reference to FIG. 1). The detecting of the UE(s) 102 as the possible malicious UE(s) 104 can be performed as discussed above with reference to FIGS. 1 and 2.

The process 300 can include downgrading the possible malicious UE(s) 304. For example, the downgrading the possible malicious UE(s) 304 can include downgrading the possible malicious UE(s) 104.

In various examples, the downgrading the possible malicious UE(s) 304 can include blocking rich communication services (RCS) communications 306. In those or other examples, the RCS communications being blocked, via the blocking RCS communications 306 can include the RCS communication(s) 114. The blocking RCS communications 306 can be performed to modify the communication mode 110 associated with the UE(s) 102 identified as the possible malicious UE(s) 104 to be the downgraded communication mode 112.

For example, a communication mode associated with a UE 102 can be selected as a downgraded mode or a non-downgraded mode (e.g., an initial mode, a non-spam related mode, etc.). In such an example or another example, the downgraded mode can be simpler than the non-downgraded mode. The downgraded mode can have RCS capabilities blocked. The non-downgraded mode can have RCS capabilities.

The process 300 can include detecting possible malicious UEs as malicious UEs 308. The possible malicious UEs being detected as the malicious UEs via the detecting possible malicious UEs as malicious UEs 308 can include individual ones of the possible malicious UE(s) 104 being detected as corresponding malicious UE(s).

The process 300 can include flagging short messaging services (SMS)/multimedia messaging services (MMS) communications 310, blocking SMS/MMS communications 312, reporting SMS/MMS communications 314, one or more other operations, and/or any combination thereof. In some examples, the flagging SMS/MMS communications 310 can be utilized to flag SMS/MMS communications identified as spam, and/or fraud related communications. The flagged SMS/MMS communications can be utilized to identify one or more other communications, such as subsequent communications (e.g., SMS communications, MMS communications, one or more other type of communications, etc., or any combination thereof), associated with the malicious UEs. The other communication(s) can be flagged and/or blocked, and/or utilized to inform other networks of the malicious UE(s).

The flagged SMS/MMS communications can be utilized to identify one or more related UEs being operated by one or more users that may be operating the malicious UEs. The flagged SMS/MMS communications can be utilized to identify one or more subsequent communications (e.g., RCS communications, SMS communications, MMS communications, one or more other type of communications, etc., or any combination thereof) associated with the related UEs. The other communication(s) can be flagged and/or blocked, and/or utilized to inform other networks of the related UE(s) being possible malicious UE(s) and/or being malicious UE(s).

In those or other examples, the blocking SMS/MMS communications 312 can be utilized to block the SMS/MMS communication identified as the spam, and/or the fraud related communications. In some cases, the blocking SMS/MMS communications 312 can be utilized to prevent one or more destinations (e.g., UE(s) to which the communication(s) are being transmitted) from receiving the spam, and/or the fraud related communications.

In those or other examples, the reporting SMS/MMS communications 314 can be utilized to transmit one or more communications that identify the possible malicious UE(s) 104 and/or the malicious UE(s). For instance, the communications that identify the possible malicious UE(s) 104 and/or the malicious UE(s) can be transmitted to one or more networks to which the possible malicious UE(s) 104 and/or the malicious UE(s) may be communicatively connected. In such an instance or another instance, the communications that identify the possible malicious UE(s) 104 and/or the malicious UE(s) can be transmitted to one or more other networks to which the possible malicious UE(s) 104 and/or the malicious UE(s) are not communicatively connected.

One or more various networks (e.g., the networks to which the possible malicious UE(s) 104 and/or the malicious UE(s) may be communicatively connected, the other networks, or any combination thereof) may utilize the communications that identify the possible malicious UE(s) 104 and/or the malicious UE(s) to manage spam and/or fraud related communications from being routed, more effectively. The various networks can be block spam and/or fraud related communications generated by the possible malicious UE(s) 104 and/or the malicious UE(s) from being routed, more effectively.

Figure 4:
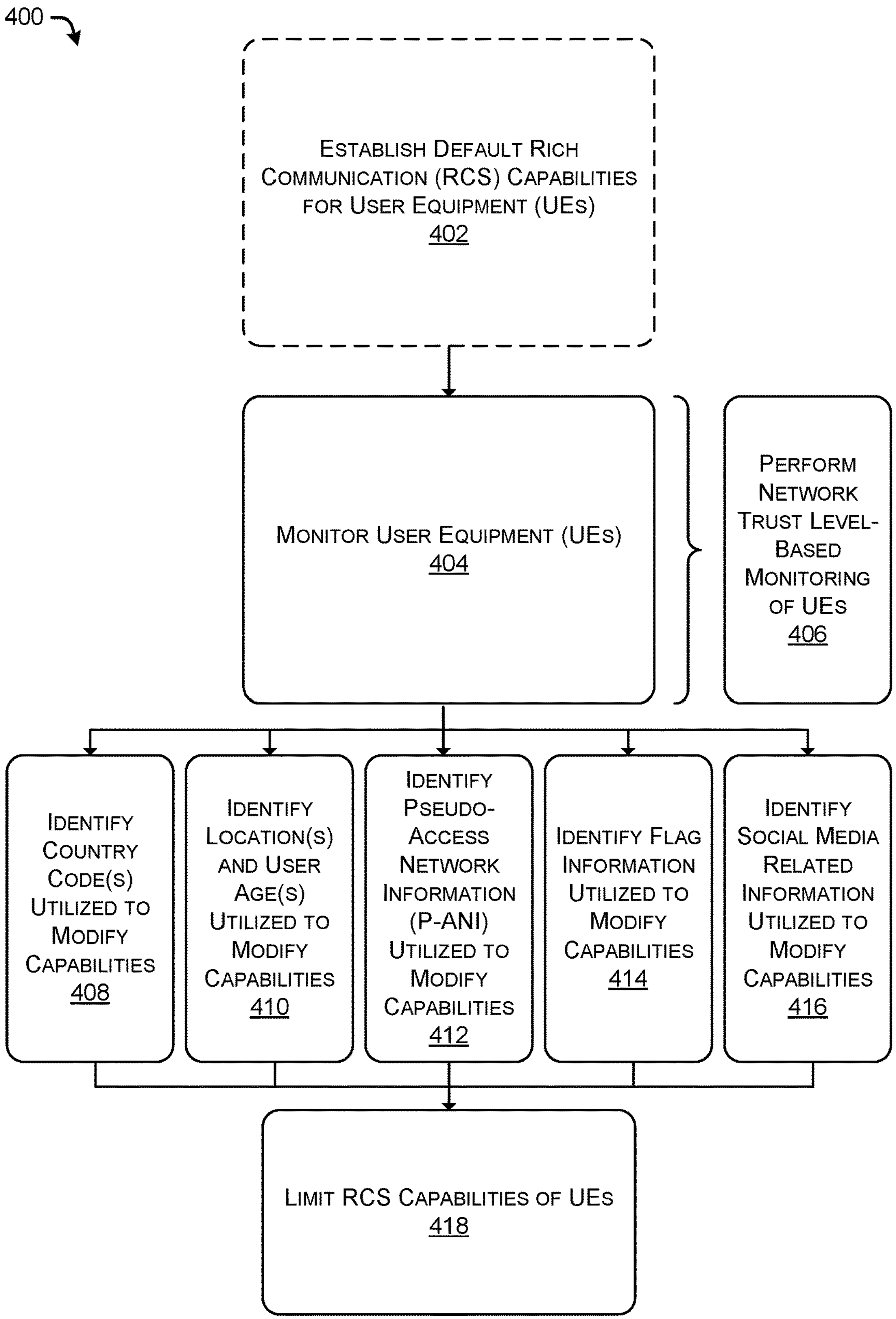
FIG. 4 is a flow diagram illustrating an example process of possible malicious user equipment (UE) detection-based rich communication services (RCS) capabilities downgrade management according to various categories of information.

FIG. 4 is a flow diagram illustrating an example process 400 of possible malicious user equipment (UE) detection-based rich communication services (RCS) capabilities downgrade management according to various categories of information. The process 400 can include establishing default rich services communications (RCS) capabilities for UEs 402. A default communication mode including the default RCS capabilities may be established for the UE(s). The default RCS capabilities can be established and utilized for the UEs, such as the UE(s) 102 as discussed above with reference to FIG. 1. In various examples, the default RCS capabilities can include, as default non-RCS capabilities, prohibiting RCS communications as a default RCS capabilities mode for a group of the UE(s) 102, such as a partial group of an entire group of the UE(s) 102.

In various examples, the process 400 can be implemented by the environments 100 and 200 as discussed above with reference to FIGS. 1 and 2. For example, one or more operations, actions, functions, etc., associated with the process 400 can be implemented by one or more devices of various types, such as the server(s) of the environments 100 and 200.

The default RCS capabilities, which can include default non-RCS-capabilities, can be utilized to block the UE(s) 102 from exchanging RCS communications until establishing the UE(s) 102 have proven themselves as trustworthy. Establishing whether the UE(s) 102 have proven themselves as trustworthy can be performed utilizing an analysis that is the same as, or different from, the analysis as discussed above with reference to FIG. 1 for monitoring and/or analyzing the short messaging services (SMS)/multimedia messaging services (MMS) communications associated with the possible malicious UE(s) 104.

In additional or alternative examples, the establishing default RCS) capabilities for UEs 402 can include enabling RCS communications as a default RCS capabilities mode for a group of the UE(s) 102, such as a partial group of an entire group of the UE(s) 102. By enabling RCS communications as the default RCS capabilities mode, the default RCS capabilities mode can be utilized to enable the UE(s) 102 from exchanging RCS communications unless the UE(s) 102 are identified as the possible malicious UE(s) 104.

The process 400 can include monitoring UEs 404. The monitoring UEs 404 can include monitoring SMS/MMS communications for individual ones of UE(s) in a group that includes UE(s) with the default RCS capabilities mode that prohibits RCS communications. Additionally or alternatively, the monitoring UEs 404 can include monitoring RCS communications for dividual ones of UE(s) in a group that includes UE(s) with the default RCS capabilities mode that enables RCS communications.

The default RCS capabilities mode associated with any of the UE(s) can be established based on various characteristics. One or more characteristics utilized to establish one or more default RCS capabilities modes associated with corresponding UE(s) 102 can include one or more country codes, one or more geolocations, one or more user ages, one or more of various types of pseudo-access network information (P-ANI) information, one or more of various types of flag information, one or more of various types of social media related information, one or more other types of information, or any combination thereof.

In various examples, the monitoring UE(s) 404 can include performing network trust level-based monitoring of UEs 406. The performing network trust level-based monitoring of UEs 406 can include monitoring the UE(s) 102 by identify one or more network trust levels associated with the UE(s) 102.

The network trust level(s) associated with UE(s) in one or more different networks can vary based on information associated with the network(s). The information can include trust related information based on historical characteristics, historical behavior, etc., or any combination thereof, associated with the network(s). In some examples, the network trust level(s) can include a relatively higher trust level associated with a network based on the network information associated with the network indicating a relatively higher likelihood of UE(s) associated with the network as being non-malicious. In those or other examples, the network trust level(s) can include a relatively lower trust level associated with a network based on the network information associated with the network indicating a relatively lower likelihood of UE(s) associated with the network as being non-malicious.

In some examples, the performing network trust level-based monitoring of UEs 406 can include utilizing a relatively higher probability threshold associated with identifying a probability of a UE 102 being a possible malicious UE 104, based on the UE 102 being communicatively coupled to the network with the relatively higher trust level. In those or other examples, the performing network trust level-based monitoring of UEs 406 can include utilizing a relatively lower probability threshold associated with identifying a probability of a UE 102 being a possible malicious UE 104, based on the UE 102 being communicatively coupled to the network with the relatively lower trust level.

One or more downgrade related operations can be utilized to downgrade UE(s) 102 by managing RCS capabilities based on the downgrade related operation(s). The process 400 can include the downgrade related operation(s), which can include identifying one or more country codes utilized to modify capabilities 408, identifying one or more locations and one or more user ages utilized to modify capabilities 410, identifying pseudo-access network information (P-ANI) utilized to modify capabilities 412, identifying flag information utilized to modify capabilities 414, identifying social media related information utilized to modify capabilities 416, one or more other operations, or any combination thereof. The P-ANI can include, for example, one or more portions of P-ANI. The social media related information can include, for example, one or more portions of social media related information.

In some examples, based on the identifying country code(s) utilized to modify capabilities 408, the country code(s) associated with corresponding UE(s) 102 can be identified and utilized to downgrade or not downgrade RCS capabilities associated with the corresponding UE(s) 102. The RCS capabilities can be downgraded for a corresponding UE 102 identified as being a possible malicious UE 104 by downgrading (or "demoting") a communication mode. An SIP message, such as a SIP notify message, can be transmitted including supported capabilities (e.g., non-RCS capabilities) associate with the demoted communication mode. The RCS capabilities can be not downgraded for a corresponding UE 102 that is identified as not being a possible malicious UE 104 by not downgrading (or "not demoting") a communication mode. An SIP message, such as a SIP notify message, can be transmitted including supported capabilities (e.g., RCS capabilities) associate with the communication mode that is not downgraded.

In those or other examples, the country code(s) can be utilized to manage one or more downgrades associated with the corresponding UE(s) 102. The downgrade(s) can be managed based on one or more downgrade scores and/or one or more downgrade score thresholds.

In some cases, the downgrade(s) can be managed by analyzing the UE(s) 102 and/or the country code(s). Individual ones of the downgrade(s) can be managed by identifying corresponding downgrade score(s) for the country code(s) and comparing the downgrade score(s) with various ones of the downgrade score threshold(s). For instance, a downgrade score may be generated for a country code based on the country code, and/or a location with which the country code is associated. In such an instance or another instance, a relatively higher downgrade score may be associated with a country code based on spam and/or fraud related communications being relatively more likely to be received from the location. A downgrade can be performed based on a corresponding downgrade score being more than a downgrade score threshold.

In such an instance or another instance, a relatively lower downgrade score may be associated with another country code based on spam and/or fraud related communications being relatively less likely to be received from another corresponding location. A downgrade can be not performed based on a corresponding downgrade score being less than a downgrade score threshold.

By utilizing the location to control whether the downgrade(s) are performed, various users of the UE(s) 102 that may be in locations that have relatively higher risks if undesirable results occur as a result of spam and/or fraud may receive increased protection. For example, the locations may include locations associated with confidential, sensitive, and/or private information, locations associated with academic institutions, locations associated with government institutions, etc., or any combination thereof.

In some examples, based on the identifying one or more locations and one or more user ages utilized to modify capabilities 410, the location(s) (e.g., one or more geolocations) and/or the age(s) associated with corresponding UE(s) 102 can be identified and utilized to downgrade or not downgrade RCS capabilities associated with the corresponding UE(s) 102. In those or other examples, the location(s) and/or the age(s) can be utilized to manage one or more downgrades associated with the corresponding UE(s) 102.

The downgrade(s) can be managed based on one or more downgrade scores and/or one or more downgrade score thresholds.

In some cases, the downgrade(s) can be managed by analyzing the UE(s) 102, the geolocation(s), and/or the age(s). Individual ones of the downgrade(s) can be managed by identifying corresponding downgrade score(s) for the geolocation(s) and/or the age(s), and comparing the downgrade score(s) with various ones of the downgrade score threshold(s). For instance, a downgrade score may be generated for a UE 102 based on a geolocation and/or an age associated with the UE 102. In such an instance or another instance, a relatively higher downgrade score may be associated with a geolocation based on the geolocation being relatively more likely to include users of relatively lower ages. In such an instance or another instance, a relatively higher downgrade score may be associated with a geolocation based on an age of a UE 102 being relatively lower. A downgrade can be performed based on a corresponding downgrade score being more than a downgrade score threshold.

In such an instance or another instance, a relatively lower downgrade score may be associated with a geolocation based on the geolocation being relatively less likely to include users of relatively lower ages. In such an instance or another instance, a relatively lower downgrade score may be associated with a geolocation based on an age of a UE 102 being relatively higher. A downgrade can be not performed based on a corresponding downgrade score being less than a downgrade score threshold.

By utilizing the geolocation and/or the age to control whether the downgrade(s) are performed, various users of the UE(s) 102 that may be more susceptible and/or vulnerable to spam and/or fraud may receive increased protection. Downgrading the UE(s) 102 may enable relatively greater protection to be provided for the susceptible and/or vulnerable users.

In some examples, based on the identifying the portion(s) of pseudo-access network information (P-ANI) utilized to modify capabilities 412, the portion(s) of P-ANI associated with corresponding UE(s) 102 can be identified and utilized to downgrade or not downgrade RCS capabilities associated with the corresponding UE(s) 102. In those or other examples, the portion(s) of P-ANI can be utilized to manage one or more downgrades associated with the corresponding UE(s) 102. The downgrade(s) can be managed based on one or more downgrade scores and/or one or more downgrade score thresholds.

In some cases, the downgrade(s) can be managed by analyzing the UE(s) 102 and/or the portion(s) of P-ANI. Individual ones of the downgrade(s) can be managed by identifying corresponding downgrade score(s) for the portion(s) of P-ANI and comparing the downgrade score(s) with various ones of the downgrade score threshold(s). For instance, a downgrade score may be generated for a UE 102 based on P-ANI associated with the UE 102, and/or P-ANI associated with a communication with the UE 102. In such an instance or another instance, a relatively higher downgrade score may be associated with the communication of the UE 102 not being utilized for a 9-1-1 call. In such an instance or another instance, a relatively lower downgrade score may be associated with the communication of the UE 102 not being utilized for a 9-1-1 call.

By utilizing the P-ANI to control whether the downgrade(s) are performed, downgrades can be avoided for calls of relatively greater importance. In some cases, the downgrades can be performed based on the relatively higher downgrade scores for non-9-1-1 calls of relatively lessor importance.

In some examples, based on the identifying flag information utilized to modify capabilities 414, the one or more flags of the flag information associated with corresponding UE(s) 102 can be identified and utilized to downgrade or not downgrade RCS capabilities associated with the corresponding UE(s) 102. In those or other examples, the flag(s) can be utilized to manage one or more downgrades associated with the corresponding UE(s) 102. The downgrade(s) can be managed based on one or more downgrade scores and/or one or more downgrade score thresholds.

In some cases, the downgrade(s) can be managed by analyzing the UE(s) 102 and/or the flag(s). Individual ones of the downgrade(s) can be managed by identifying corresponding downgrade score(s) for the flag(s) and comparing the downgrade score(s) with various ones of the downgrade score threshold(s). For instance, a downgrade score may be generated for a UE 102 based on a flag associated with the UE 102. In such an instance or another instance, a relatively higher downgrade score may be associated with a flag based on the flag indicating that the UE 102 was previously utilized for spam and/or fraud related communications. A downgrade can be performed based on a corresponding downgrade score being more than a downgrade score threshold.

In such an instance or another instance, a relatively lower downgrade score may be associated with an absence of flag associated with a UE 102, based on the absence of the flag. A downgrade can be not performed based on a corresponding downgrade score being less than a downgrade score threshold. By utilizing the flag to control whether the downgrade(s) are performed, downgrades may be performed for various UE(s) 102, such as the possible malicious UE(s) 104, that may be relatively more likely to engage in exchanging spam and/or fraud related communications.

In some examples, based on the identifying social media related information utilized to modify capabilities 416, the portion(s) of the social media information associated with corresponding UE(s) 102 can be identified and utilized to downgrade or not downgrade RCS capabilities associated with the corresponding UE(s) 102. In those or other examples, the portion(s) of the social media information can be utilized to manage one or more downgrades associated with the corresponding UE(s) 102. The downgrade(s) can be managed based on one or more downgrade scores and/or one or more downgrade score thresholds.

In some cases, the downgrade(s) can be managed by analyzing the UE(s) 102 and/or the portion(s) of the social media information. Individual ones of the downgrade(s) can be managed by identifying corresponding downgrade score(s) for the portion(s) of the social media information and comparing the downgrade score(s) for the UE(s) 102 with the portion(s) of the social media information with various ones of the downgrade score threshold(s). For instance, a downgrade score may be generated for a UE 102 based on a portion of social media information associated with the UE 102. In such an instance or another instance, a relatively higher downgrade score may be associated with a portion of social media information based on the portion of social media information indicating that the UE 102 was previously utilized for spam and/or fraud related communications. A downgrade can be performed based on a corresponding downgrade score being more than a downgrade score threshold.

In such an instance or another instance, a relatively lower downgrade score may be associated with a portion of social media information indicating a UE 102 was not previously engaged in exchanging spam and/or fraud related communications. A downgrade can be not performed based on a corresponding downgrade score being less than a downgrade score threshold. By utilizing the flag to control whether the downgrade(s) are performed, downgrades may be not performed for various UE(s) 102, such as non-malicious UE(s), that may be relatively less likely to engage in exchanging spam and/or fraud related communications.

The process 400 can include limiting RCS capabilities of UEs 418. Managing RCS capabilities of UEs can include identifying the UE(s) 102, the network trust level(s), the country code(s), the location(s)/user age(s), the flag information, the social media related information, one or more other characteristic parameters, or any combination thereof, utilized to control RCS capabilities of the UE(s) 102. The managing RCS capabilities of UEs can include managing the UE(s) 102 based on downgrade scores being associated with the network trust level(s), the country code(s), the location(s)/user age(s), the flag information, the social media related information, the other characteristic(s), or any combination thereof, utilized to control RCS capabilities of the UE(s) 102.

In some examples, the limiting RCS capabilities of UEs 418 can include limiting the UE(s) 102 based on relatively higher downgrade scores being associated with the network trust level(s), the country code(s), the location(s)/user age (s), the flag information, the social media related information, the other characteristic(s), or any combination thereof, utilized to control RCS capabilities of the UE(s) 102. In those or other examples, the limiting RCS capabilities of UEs 418 can include limiting (e.g., removing) RCS capabilities of individual ones of the UE(s) 102 based on the relatively higher downgrade scores being greater than a downgrade score threshold. In those or other examples, the limiting RCS capabilities of UEs 418 can include not limiting (e.g., removing) RCS capabilities of individual ones of other UE(s) 102 based on the relatively lower downgrade scores associated with the other UE(s) 102 being lower than a downgrade score threshold.

Although the network trust level(s), the country code(s), the location(s)/user age(s), the flag information, the social media related information, the other characteristic(s), or any combination thereof, can be utilized to control the RCS capabilities of the UE(s) 102, as discussed above in the current disclosure, it is not limited as such. In some examples, the network trust level(s), the country code(s), the location(s)/user age(s), the flag information, the social media related information, the other characteristic(s), or any combination thereof, can be utilized, additionally or alternatively to, the determinations of the UE(s) 102 as the possible malicious UE(s) 104, to limit the RCS capabilities. In those or other examples, the network trust level(s), the country code(s), the location(s)/user age(s), the flag information, the social media related information, the other characteristic(s), or any combination thereof, can be utilized, additionally or alternatively to, the determinations of the possible malicious UE(s) 104 as the malicious UE(s), to control SMS/MMS communications.

In some examples, the network trust level(s), the country code(s), the location(s)/user age(s), the flag information, the social media related information, the other characteristic(s), the determinations of the UE(s) 102 as the possible malicious UE(s) 104, or any combination thereof, can be utilized, additionally or alternatively to, usage information associated with the UE(s) 102, to limit the RCS capabilities. For instance, the usage information can include individual ones of one or more usage identifiers associated with corresponding UE(s) 102 to control RCS capabilities.

In some examples, the usage information can include individual ones of the usage identifier(s) associated with corresponding UE(s) 102 that indicate mobile station international subscriber directory numbers (MSISDNs) associated with corresponding UE(s) 102 have not been used by the corresponding UE(s) 102 before, to limit RCS capabilities. By limiting the RCS capabilities for UE(s) 102 with new MSISDNs, exchange of spam and/or fraud related communications may be reduced and/or avoided.

Because malicious UE(s) may utilize new MSISDNs to exchange SPAM, limiting the exchange of spam and/or fraud related communications can be performed more effectively by first scanning SMS/MMS messages for individual ones of the UE(s) 102 with the new MSISDNs until a number and/or type of the SMS/MMS messages indicates a likelihood of the SMS/MMS messages not being spam and/or fraud related communications that is below a threshold likelihood. By limiting the exchange of spam and/or fraud related communications for the UE(s) 102 with the new MSISDNs, the UE(s) 102 can be required to prove with a likelihood beyond a threshold likelihood that they are non-malicious UE(s).

By utilizing the network trust level(s), the country code (s), the location(s)/user age(s), the flag information, the social media related information, the usage identifier(s), the other characteristic(s), the determinations of the UE(s) 102 as the possible malicious UE(s) 104, or any combination thereof, to manage the RCS capabilities, encrypted communications associated with the characteristics of the possible malicious UE(s) 104 that may be determined to have relatively higher downgrade scores can be reduced in number and/or avoided. By reducing in number, the encrypted communications for the possible malicious UE(s) 104 with the characteristics that have relatively higher downgrade scores, message content of those UE(s) may be controlled to be unencrypted communications.

By reducing in number, the RCS communications for the possible malicious UE(s) 104 with the characteristics that may be determined to have relatively higher downgrade scores, transportations of large files for the possible malicious UE(s) 104 that may otherwise be performed may be reduced. Alternatively or additionally, numbers of concurrent session internet protocol (SIP) internet sessions may be reduced by reducing in umber, the RCS communications for the possible malicious UE(s) 104 with the characteristics that may be determined to have relatively higher downgrade scores. Reducing the numbers of concurrent SIP sessions, consumption of network, compute, and/or memory resources may be reduced.

By reducing in number, the RCS communications for the possible malicious UE(s) 104 with the characteristics that may be determined to have relatively higher downgrade scores, protocol overheads, such as message session relay protocol (MSRP) feedback overheads, mobile directory number (MDN) feedback overheads, etc., may be reduced. Because bad actors (e.g., the malicious UE(s)) may utilize the MSRP feedback, the MDN feedback, or various other feedback for purposes of exchanging spam and/or fraud related communications, limiting the RCS communications for the possible malicious UE(s) 104 may reduce the MSRP feedback, the MDN feedback, or the various other feedback. By reducing the MSRP feedback, the MDN feedback, or the various other feedback, numbers of subsequent spam and/or fraud related communications may be reduced.

Figure 5:
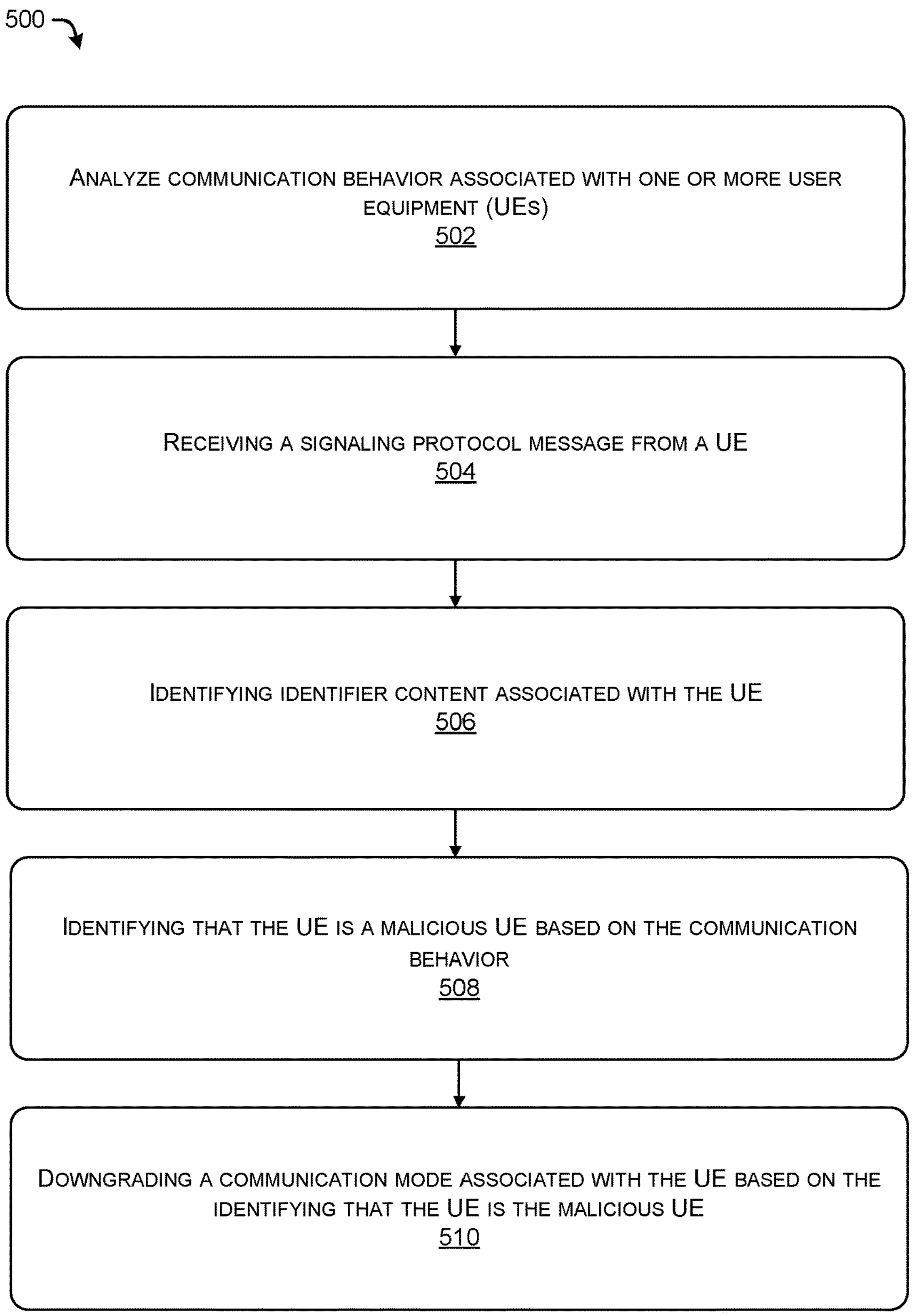
FIG. 5 illustrates an example process for possible malicious user equipment (UE) detection-based rich communication services (RCS) capabilities downgrade management.

FIG. 5 illustrates an example process 500 for possible malicious user equipment (UE) detection-based rich communication services (RCS) capabilities downgrade management. In various examples, the process 500 can be performed by the server(s) as discussed above with reference to FIGS. 1 and 2.

At operation 502, the process 500 can include analyzing communication behavior associated with one or more user equipment (UEs) 102.

At operation 504, the process 500 can include receiving a signaling protocol message from a UE 102. For example, the signaling protocol message can include an RCS message.

At operation 506, the process 500 can include identifying identifier content associated with the UE 102. The identifier content can include a mobile station international subscriber directory number (MSISDN) or any other type of identifier associated with the UE 102.

At operation 508, the process 500 can include identifying that the UE 102 is a malicious UE (e.g., a possible malicious UE 104) based on the communication behavior. The UE 102 is a possible malicious UE 104 based on the communication behavior.

At operation 510, the process 500 can include downgrading a communication mode associated with the UE based on the identifying that the UE is the malicious UE. The communication mode can include an RCS capable mode being downgraded to a non-RCS capable communication mode.

Figure 6:
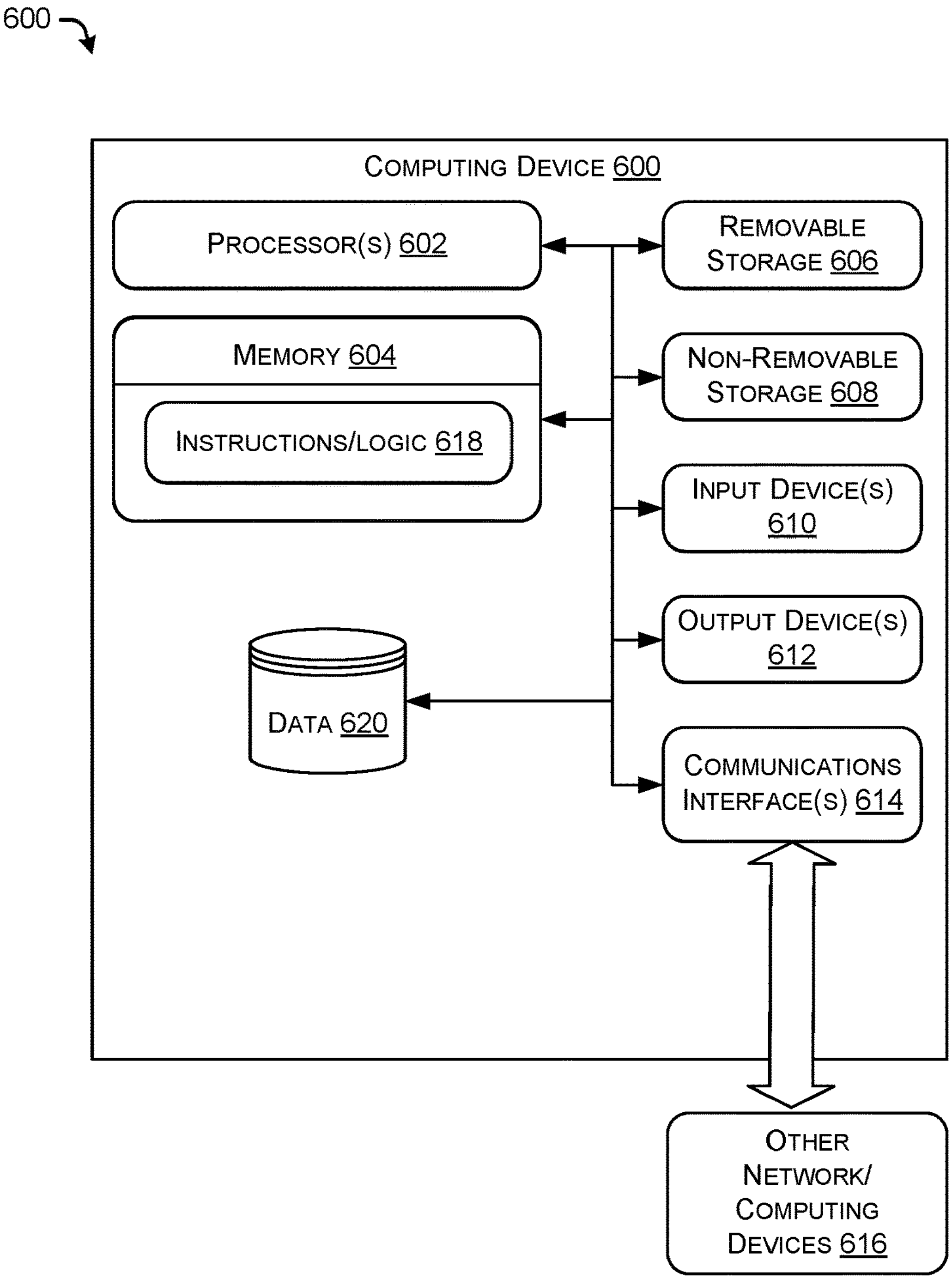
FIG. 6 depicts an example system architecture for a computing device.

FIG. 6 depicts an example system architecture for a computing device 600. FIG. 6 is a block diagram of an example server computer utilized to implement the location-based computer-altered reality data rendering management using object characteristic data. The computing device 600 may be representative of any of one or more servers, as discussed above with reference to FIG. 1), or any combination thereof.

As shown, the computing device 600 may include one or more processors 602 and one or more forms of computer-readable memory 604. The computing device 600 may also include additional storage devices. Such additional storage may include removable storage 606 and/or non-removable storage 608.

The computing device 600 may further include input devices 610 (e.g., a touch screen, keypad, keyboard, mouse, pointer, microphone, etc.) and output devices 612 (e.g., a display, printer, speaker, etc.) communicatively coupled to the processor(s) 602 and the computer-readable memory 604. The computing device 600 may further include communications interface(s) 614 that allow the computing device 600 to communicate with other network and/or computing devices 616 (e.g., any of the server(s) as discussed above with reference to FIG. 1) such as via a network. The communications interface(s) 614 may facilitate transmitting and receiving wired and/or wireless signals over any suitable communications/data technology, standard, or protocol, as described herein.

In various examples, the computer-readable memory 604 comprises non-transitory computer-readable memory 604 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 604 may also be described as computer storage media and may include volatile and nonvolatile, removable and non-removable media implemented in any method or technology for storage of information, such as computer readable instructions, data structures, program modules, or other data. Computer-readable memory 604, removable storage 606 and non-removable storage 608 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the computing device 600. Any such computer-readable storage media may be part of the computing device 600.

The memory 604 can include logic 618 (i.e., computer-executable instructions that, when executed, by the processor(s) 602, perform the various acts and/or processes disclosed herein) to implement automated dependency graph builder management, according to various examples as discussed herein. For example, the logic 618 is configured to carry out location-based computer-altered reality data rendering management using object characteristic data, via any of the server(s). The memory 604 can further be used to store data 620, which may be used to implement location-based computer-altered reality data rendering management, as discussed herein. In one example, the data 620 may include any type of data (e.g., the computer-altered reality data (e.g., the XR data), the characteristic data, etc.), any type of information (e.g., the rendering location information, the network category information, etc.), and so on, or any combination thereof.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A method comprising:

analyzing communication behavior associated with one or more user equipment (UEs);

receiving a signaling protocol message from a UE;

identifying identifier content associated with the UE;

identifying that the UE is a malicious UE based on the communication behavior; and downgrading from a first communication mode associated with the UE to a second communication mode based on the identifying that the UE is the malicious UE, wherein the first communication mode is a rich communication services (RCS) communication mode and the second communication mode is a short messaging service (SMS) or a multimedia messaging service (MMS) communication mode, and wherein the downgrading comprises transmitting a session initiation protocol (SIP) notify message to the UE, the SIP notify message indicating supported capabilities associated with the second communication mode and at least one capability that is not supported by the first communication mode.

2. The method of claim 1, further comprising:

stripping a capability off the malicious UE based on the downgrading the first communication mode to the second communication mode, the capability including a chat capability, a group chat capability, or a file transfer capability.

3. The method of claim 1, wherein analyzing the communication behavior comprises analyzing, by a rules engine model, the communication behavior to set a flag enabling an action to be performed by the UE.

4. The method of claim 1, further comprising:

scanning traffic associated with communications exchanged with the malicious UE to identify whether the traffic includes malicious traffic.

5. The method of claim 1, setting a flag based on the identifying that the UE is the malicious UE; and inserting the flag in a header in a signaling protocol reply, the flag indicating to an originating network from which the signaling protocol reply is received that the UE is the malicious UE.

6. The method of claim 1, wherein the identifier content includes a mobile station international subscriber directory number (MSISDN).

7. The method of claim 1, wherein receiving the signaling protocol message comprises receiving a session initiation protocol (SIP) subscribe message.

8. The method of claim 1, wherein the SIP notify message omits any indication that the UE has been identified as the malicious UE.

9. The method of claim 1, further comprising:

monitoring short messaging service (SMS) or multimedia messaging service (MMS) communications exchanged with the UE subsequent to the downgrading to identify whether the SMS or MMS communications include spam or fraud related content.

10. The method of claim 1, wherein analyzing the communication behavior comprises analyzing, by a machine learning model, one or more characteristics associated with communications exchanged with the UE.

11. A network element, comprising:

one or more processors; and memory storing computer-executable instructions that, when executed by the one or more processors, cause the one or more processors to perform operations comprising:

analyzing communication behavior associated with one or more user equipment (UEs);

receiving a signaling protocol message from a user equipment (UE);

identifying identifier content associated with the UE;

identifying that the UE is a malicious UE based on the communication behavior; and downgrading from a first communication mode associated with the UE to a second communication mode based on the identifying that the UE is the malicious UE, wherein the first communication mode is a rich communication services (RCS) communication mode and the second communication mode is a short messaging service (SMS) or a multimedia messaging service (MMS) communication mode, and wherein the downgrading comprises transmitting a session initiation protocol (SIP) notify message to the UE, the SIP notify message indicating supported capabilities associated with the second communication mode and at least one capability that is not supported by the first communication mode.

12. The network element of claim 11, wherein the first communication mode includes at least one capability that is not included in the second communication mode.

13. The network element of claim 11, wherein the downgrading further comprises:

setting the second communication mode as a default communication mode associated with the UE, and where maintaining the default communication mode based on the identifying that the UE is the malicious UE.

14. The network element of claim 11, wherein the operations further comprise:

transmitting a trust level corresponding to the UE being the malicious UE.

15. The network element of claim 11, wherein the downgrading to the second communication mode is utilized to disable a chat function, a group chat function, or a file transfer function.

16. The network element of claim 11, the operations further comprising monitoring short messaging service (SMS) or multimedia messaging service (MMS) communications exchanged with the UE subsequent to the downgrading to identify whether the SMS or MMS communications include spam or fraud related content.

17. The network element of claim 11, wherein the SIP notify message omits any indication that the UE has been identified as the malicious UE.

18. A system comprising:

one or more processors; and memory storing computer-executable instructions that, when executed by the one or more processors, cause the one or more processors to perform operations comprising:

analyzing communication behavior associated with one or more user equipment (UEs);

receiving a signaling protocol message from a user equipment (UE);

identifying that the UE is a malicious UE based on the signaling protocol message and the communication behavior; and selecting a communication mode associated with the UE based on the identifying that the UE is the malicious UE, the communication mode lacking at least one capability of another communication mode, wherein the first communication mode is a rich communication services (RCS) communication mode and the second communication mode is a short messaging service (SMS) or a multimedia messaging service (MMS) communication mode, and wherein the downgrading comprises transmitting a session initiation protocol (SIP) notify message to the UE, the SIP notify message indicating supported capabilities associated with the second communication mode and at least one capability that is not supported by the first communication mode.

19. The system of claim 18, wherein the other communication mode is associated with another UE that is identified as a non-malicious UE.

20. The system of claim 18, wherein the communication mode is associated with a downgrade score that is greater than a downgrade score threshold, the downgrade score being based on one or more of a country code, a geolocation, a user age, pseudo-access network information, flag information, or social media related information associated with the UE.

* * * * *